United States Patent
Jarvis et al.

(10) Patent No.: US 10,740,065 B2
(45) Date of Patent: *Aug. 11, 2020

(54) VOICE CONTROLLED MEDIA PLAYBACK SYSTEM

(71) Applicant: Sonos, Inc, Santa Barbara, CA (US)

(72) Inventors: Simon Jarvis, Cambridge, MA (US); Romi Kadri, Cambridge, MA (US); Christopher Butts, Evanston, IL (US)

(73) Assignee: Sonos, Inc., Santa Barbara, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 15/973,413

(22) Filed: May 7, 2018

(65) Prior Publication Data

US 2018/0253281 A1 Sep. 6, 2018

Related U.S. Application Data

(63) Continuation of application No. 15/131,776, filed on Apr. 18, 2016, now Pat. No. 9,965,247.
(Continued)

(51) Int. Cl.
*H04R 5/02* (2006.01)
*G06F 3/16* (2006.01)
(Continued)

(52) U.S. Cl.
CPC .............. *G06F 3/167* (2013.01); *G06F 3/165* (2013.01); *G10L 15/222* (2013.01);
(Continued)

(58) Field of Classification Search
CPC ....... G06F 3/165; G06F 3/167; G10L 17/005; G10L 2015/223
(Continued)

(56) References Cited

U.S. PATENT DOCUMENTS 4,741,038 A 4/1988 Elko et al.
4,941,187 A 7/1990 Slater
(Continued)

FOREIGN PATENT DOCUMENTS

AU 2017100486 A4 6/2017
AU 2017100581 A4 6/2017
(Continued)

OTHER PUBLICATIONS

US 9,299,346 B1, 03/2016, Hart et al. (withdrawn)
(Continued)

*Primary Examiner* — Katherine A Faley
(74) *Attorney, Agent, or Firm* — McDonnell Boehnen Hulbert & Berghoff LLP

(57) ABSTRACT

Disclosed herein are systems and methods for receiving a voice command and determining an appropriate action for the media playback system to execute based on user identification. The systems and methods receive a voice command for a media playback system, and determines whether the voice command was received from a registered user of the media playback system. In response to determining that the voice command was received from a registered user, the systems and methods configure an instruction for the media playback system based on content from the voice command and information in a user profile for the registered user.

20 Claims, 7 Drawing Sheets

Related U.S. Application Data

(60) Provisional application No. 62/298,433, filed on Feb. 22, 2016, provisional application No. 62/298,439, filed on Feb. 22, 2016, provisional application No. 62/298,425, filed on Feb. 22, 2016, provisional application No. 62/298,350, filed on Feb. 22, 2016, provisional application No. 62/298,388, filed on Feb. 22, 2016, provisional application No. 62/298,393, filed on Feb. 22, 2016.

(51) Int. Cl.
*G10L 17/00* (2013.01)
*G10L 15/22* (2006.01)
*G10L 17/22* (2013.01)

(52) U.S. Cl.
CPC ............ *G10L 17/005* (2013.01); *G10L 17/22* (2013.01); *G10L 15/22* (2013.01); *G10L 2015/223* (2013.01)

(58) Field of Classification Search
USPC ....................................................... 381/110
See application file for complete search history.

(56) References Cited

U.S. PATENT DOCUMENTS

| | | | |
|---|---|---|---|
| 5,440,644 A | 8/1995 | Farinelli et al. | |
| 5,588,065 A | 12/1996 | Tanaka et al. | |
| 5,740,260 A | 4/1998 | Odom | |
| 5,761,320 A | 6/1998 | Farinelli et al. | |
| 5,923,902 A | 7/1999 | Inagaki | |
| 6,032,202 A | 2/2000 | Lea et al. | |
| 6,088,459 A | 7/2000 | Hobelsberger | |
| 6,256,554 B1 | 7/2001 | Dilorenzo | |
| 6,301,603 B1 | 10/2001 | Maher et al. | |
| 6,311,157 B1 | 10/2001 | Strong | |
| 6,404,811 B1 | 6/2002 | Cvetko et al. | |
| 6,408,078 B1 | 6/2002 | Hobelsberger | |
| 6,469,633 B1 | 10/2002 | Wachter et al. | |
| 6,522,886 B1 | 2/2003 | Youngs et al. | |
| 6,594,347 B1 | 7/2003 | Calder et al. | |
| 6,594,630 B1 | 7/2003 | Zlokarnik et al. | |
| 6,611,537 B1 | 8/2003 | Edens et al. | |
| 6,611,604 B1 | 8/2003 | Irby et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,661,107 B1 | 2/2010 | Van Dyke et al. | |
| 7,702,508 B2 | 4/2010 | Bennett | |
| 7,792,311 B1 | 9/2010 | Holmgren et al. | |
| 7,853,341 B2 | 12/2010 | McCarty et al. | |
| 7,961,892 B2 | 6/2011 | Fedigan | |
| 7,987,294 B2 | 7/2011 | Bryce et al. | |
| 8,014,423 B2 | 9/2011 | Thaler et al. | |
| 8,041,565 B1 * | 10/2011 | Bhardwaj | G10L 15/28 704/235 |
| 8,045,952 B2 | 10/2011 | Qureshey et al. | |
| 8,073,125 B2 | 12/2011 | Zhang et al. | |
| 8,103,009 B2 | 1/2012 | McCarty et al. | |
| 8,234,395 B2 | 7/2012 | Millington et al. | |
| 8,239,206 B1 | 8/2012 | Lebeau et al. | |
| 8,255,224 B2 | 8/2012 | Singleton et al. | |
| 8,284,982 B2 | 10/2012 | Bailey | |
| 8,290,603 B1 | 10/2012 | Lambourne et al. | |
| 8,340,975 B1 | 12/2012 | Rosenberger et al. | |
| 8,364,481 B2 | 1/2013 | Strope et al. | |
| 8,385,557 B2 | 2/2013 | Tashev et al. | |
| 8,386,261 B2 | 2/2013 | Mellott et al. | |
| 8,423,893 B2 | 4/2013 | Ramsay et al. | |
| 8,428,758 B2 | 4/2013 | Naik et al. | |
| 8,453,058 B1 | 5/2013 | Coccaro et al. | |
| 8,483,853 B1 | 7/2013 | Lambourne et al. | |
| 8,484,025 B1 | 7/2013 | Moreno et al. | |
| 8,831,761 B2 | 9/2014 | Kemp et al. | |
| 8,831,957 B2 | 9/2014 | Taubman et al. | |
| 8,938,394 B1 | 1/2015 | Faaborg et al. | |
| 8,942,252 B2 | 1/2015 | Balassanian et al. | |
| 8,983,383 B1 | 3/2015 | Haskin | |
| 8,983,844 B1 | 3/2015 | Thomas et al. | |
| 9,042,556 B2 | 5/2015 | Kallai et al. | |
| 9,094,539 B1 | 7/2015 | Noble | |
| 9,215,545 B2 | 12/2015 | Dublin et al. | |
| 9,251,793 B2 | 2/2016 | Lebeau et al. | |
| 9,253,572 B2 | 2/2016 | Beddingfield, Sr. et al. | |
| 9,262,612 B2 | 2/2016 | Cheyer | |
| 9,288,597 B2 | 3/2016 | Carlsson et al. | |
| 9,300,266 B2 | 3/2016 | Grokop | |
| 9,307,321 B1 | 4/2016 | Unruh | |
| 9,318,107 B1 | 4/2016 | Sharifi | |
| 9,319,816 B1 | 4/2016 | Narayanan | |
| 9,335,819 B1 | 5/2016 | Jaeger et al. | |
| 9,368,105 B1 | 6/2016 | Freed et al. | |
| 9,374,634 B2 | 6/2016 | Macours | |
| 9,412,392 B2 | 8/2016 | Lindahl et al. | |
| 9,426,567 B2 | 8/2016 | Lee et al. | |
| 9,431,021 B1 | 8/2016 | Scalise et al. | |
| 9,443,527 B1 | 9/2016 | Watanabe et al. | |
| 9,472,201 B1 | 10/2016 | Sleator | |
| 9,472,203 B1 | 10/2016 | Ayrapetian et al. | |
| 9,484,030 B1 | 11/2016 | Meaney et al. | |
| 9,489,948 B1 | 11/2016 | Chu et al. | |
| 9,494,683 B1 | 11/2016 | Sadek | |
| 9,509,269 B1 | 11/2016 | Rosenberg | |
| 9,510,101 B1 | 11/2016 | Polleros | |
| 9,514,752 B2 | 12/2016 | Sharifi | |
| 9,536,541 B2 | 1/2017 | Chen et al. | |
| 9,548,053 B1 | 1/2017 | Basye et al. | |
| 9,548,066 B2 | 1/2017 | Jain et al. | |
| 9,552,816 B2 | 1/2017 | Vanlund et al. | |
| 9,560,441 B1 | 1/2017 | McDonough, Jr. et al. | |
| 9,576,591 B2 | 2/2017 | Kim et al. | |
| 9,601,116 B2 | 3/2017 | Casado et al. | |
| 9,615,170 B2 | 4/2017 | Kirsch et al. | |
| 9,615,171 B1 | 4/2017 | O'Neill et al. | |
| 9,626,695 B2 | 4/2017 | Balasubramanian et al. | |
| 9,632,748 B2 | 4/2017 | Faaborg et al. | |
| 9,633,186 B2 | 4/2017 | Ingrassia, Jr. et al. | |
| 9,633,368 B2 | 4/2017 | Greenzeiger et al. | |
| 9,633,660 B2 | 4/2017 | Haughay et al. | |
| 9,633,671 B2 | 4/2017 | Giacobello et al. | |
| 9,633,674 B2 | 4/2017 | Sinha et al. | |
| 9,640,179 B1 | 5/2017 | Hart et al. | |
| 9,640,183 B2 | 5/2017 | Jung et al. | |
| 9,641,919 B1 | 5/2017 | Poole et al. | |
| 9,646,614 B2 | 5/2017 | Bellegarda et al. | |
| 9,653,060 B1 | 5/2017 | Hilmes et al. | |
| 9,653,075 B1 | 5/2017 | Chen et al. | |
| 9,659,555 B1 | 5/2017 | Hilmes et al. | |
| 9,672,821 B2 | 6/2017 | Krishnaswamy et al. | |
| 9,685,171 B1 | 6/2017 | Yang | |
| 9,691,378 B1 | 6/2017 | Meyers et al. | |
| 9,691,379 B1 | 6/2017 | Mathias et al. | |
| 9,697,826 B2 | 7/2017 | Sainath et al. | |
| 9,697,828 B1 | 7/2017 | Prasad et al. | |
| 9,698,999 B2 | 7/2017 | Mutagi et al. | |
| 9,704,478 B1 | 7/2017 | Vitaladevuni et al. | |
| 9,721,566 B2 | 8/2017 | Newendorp et al. | |
| 9,721,568 B1 | 8/2017 | Polansky et al. | |
| 9,721,570 B1 | 8/2017 | Beal et al. | |
| 9,728,188 B1 | 8/2017 | Rosen et al. | |
| 9,734,822 B1 | 8/2017 | Sundaram et al. | |
| 9,747,011 B2 | 8/2017 | Lewis et al. | |

(56) References Cited

U.S. PATENT DOCUMENTS

| | | |
|---|---|---|
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,762,967 B2 | 9/2017 | Clarke et al. |
| 9,811,314 B2 | 11/2017 | Plagge et al. |
| 9,813,810 B1 | 11/2017 | Nongpiur |
| 9,813,812 B2 | 11/2017 | Berthelsen |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 | 1/2018 | Typrin et al. |
| 9,865,264 B2 | 1/2018 | Gelfenbeyn et al. |
| 9,881,616 B2 | 1/2018 | Beckley et al. |
| 9,916,839 B1 | 3/2018 | Scalise et al. |
| 9,947,316 B2 | 4/2018 | Millington et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0040908 A1 | 2/2003 | Yang et al. |
| 2003/0070869 A1 | 4/2003 | Hlibowicki |
| 2003/0072462 A1 | 4/2003 | Hlibowicki |
| 2003/0095672 A1 | 5/2003 | Hobelsberger |
| 2003/0157951 A1 | 8/2003 | Hasty |
| 2004/0024478 A1 | 2/2004 | Hans et al. |
| 2004/0093219 A1 | 5/2004 | Shin et al. |
| 2004/0128135 A1 | 7/2004 | Anastasakos et al. |
| 2005/0031131 A1 | 2/2005 | Browning et al. |
| 2005/0031132 A1 | 2/2005 | Browning et al. |
| 2005/0031133 A1 | 2/2005 | Browning et al. |
| 2005/0031134 A1 | 2/2005 | Leske |
| 2005/0031137 A1 | 2/2005 | Browning et al. |
| 2005/0031138 A1 | 2/2005 | Browning et al. |
| 2005/0031139 A1 | 2/2005 | Browning et al. |
| 2005/0031140 A1 | 2/2005 | Browning |
| 2005/0047606 A1 | 3/2005 | Lee et al. |
| 2005/0164664 A1 | 7/2005 | DiFonzo et al. |
| 2005/0195988 A1 | 9/2005 | Tashev et al. |
| 2005/0207584 A1 | 9/2005 | Bright |
| 2005/0268234 A1 | 12/2005 | Rossi, Jr. et al. |
| 2005/0283330 A1 | 12/2005 | Laraia et al. |
| 2006/0104451 A1 | 5/2006 | Browning et al. |
| 2006/0147058 A1 | 7/2006 | Wang |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto et al. |
| 2007/0071255 A1 | 3/2007 | Schobben |
| 2007/0076131 A1 | 4/2007 | Li et al. |
| 2007/0076906 A1 | 4/2007 | Takagi et al. |
| 2007/0140058 A1 | 6/2007 | McIntosh et al. |
| 2007/0140521 A1 | 6/2007 | Mitobe et al. |
| 2007/0142944 A1 | 6/2007 | Goldberg et al. |
| 2007/0147651 A1 | 6/2007 | Mitobe et al. |
| 2008/0037814 A1 | 2/2008 | Shau |
| 2008/0090537 A1 | 4/2008 | Sutardja |
| 2008/0221897 A1 | 9/2008 | Cerra et al. |
| 2008/0247530 A1 | 10/2008 | Barton et al. |
| 2008/0248797 A1 | 10/2008 | Freeman et al. |
| 2008/0301729 A1 | 12/2008 | Broos et al. |
| 2009/0003620 A1 | 1/2009 | McKillop et al. |
| 2009/0005893 A1 | 1/2009 | Sugii et al. |
| 2009/0010445 A1 | 1/2009 | Matsuo et al. |
| 2009/0018828 A1 | 1/2009 | Nakadai et al. |
| 2009/0076821 A1 | 3/2009 | Brenner et al. |
| 2009/0153289 A1 | 6/2009 | Hope et al. |
| 2009/0197524 A1 | 8/2009 | Haff et al. |
| 2009/0228919 A1 | 9/2009 | Zott et al. |
| 2009/0238377 A1 | 9/2009 | Ramakrishnan et al. |
| 2009/0264072 A1 | 10/2009 | Dai |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0035593 A1 | 2/2010 | Franco et al. |
| 2010/0075723 A1 | 3/2010 | Min et al. |
| 2010/0092004 A1 | 4/2010 | Kuze |
| 2010/0172516 A1 | 7/2010 | Lastrucci |
| 2010/0179874 A1 | 7/2010 | Higgins et al. |
| 2010/0211199 A1 | 8/2010 | Naik et al. |
| 2011/0033059 A1 | 2/2011 | Bhaskar et al. |
| 2011/0035580 A1 | 2/2011 | Wang et al. |
| 2011/0044489 A1 | 2/2011 | Saiki et al. |
| 2011/0091055 A1 | 4/2011 | Leblanc |
| 2011/0145581 A1 | 6/2011 | Malhotra et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0289506 A1 | 11/2011 | Trivi et al. |
| 2011/0299706 A1 | 12/2011 | Sakai |
| 2012/0022863 A1 | 1/2012 | Cho et al. |
| 2012/0078635 A1 | 3/2012 | Rothkopf et al. |
| 2012/0123268 A1 | 5/2012 | Tanaka et al. |
| 2012/0131125 A1 | 5/2012 | Seidel et al. |
| 2012/0148075 A1 | 6/2012 | Goh et al. |
| 2012/0163603 A1 | 6/2012 | Abe et al. |
| 2012/0177215 A1 | 7/2012 | Bose et al. |
| 2012/0297284 A1 | 11/2012 | Matthews, III et al. |
| 2012/0308044 A1 | 12/2012 | Vander Mey et al. |
| 2012/0308046 A1 | 12/2012 | Muza |
| 2013/0006453 A1 | 1/2013 | Wang et al. |
| 2013/0024018 A1 | 1/2013 | Chang et al. |
| 2013/0039527 A1 | 2/2013 | Jensen et al. |
| 2013/0058492 A1 | 3/2013 | Silzle et al. |
| 2013/0066453 A1 | 3/2013 | Seefeldt |
| 2013/0148821 A1 | 6/2013 | Sorensen |
| 2013/0179173 A1 | 7/2013 | Lee et al. |
| 2013/0183944 A1 | 7/2013 | Mozer et al. |
| 2013/0191122 A1 | 7/2013 | Mason |
| 2013/0198298 A1 | 8/2013 | Li et al. |
| 2013/0216056 A1 | 8/2013 | Thyssen |
| 2013/0317635 A1 | 11/2013 | Bates et al. |
| 2013/0322665 A1 | 12/2013 | Bennett et al. |
| 2013/0324031 A1 | 12/2013 | Loureiro |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0343567 A1 | 12/2013 | Triplett et al. |
| 2014/0003611 A1 | 1/2014 | Mohammad et al. |
| 2014/0003625 A1 | 1/2014 | Sheen et al. |
| 2014/0003635 A1 | 1/2014 | Mohammad et al. |
| 2014/0006026 A1 | 1/2014 | Lamb et al. |
| 2014/0034929 A1 | 2/2014 | Hamada et al. |
| 2014/0064501 A1 | 3/2014 | Olsen et al. |
| 2014/0075306 A1 | 3/2014 | Rega |
| 2014/0094151 A1 | 4/2014 | Klappert et al. |
| 2014/0100854 A1 | 4/2014 | Chen et al. |
| 2014/0122075 A1 | 5/2014 | Bak et al. |
| 2014/0145168 A1 | 5/2014 | Ohsawa et al. |
| 2014/0167931 A1 | 6/2014 | Lee et al. |
| 2014/0195252 A1 | 7/2014 | Gruber et al. |
| 2014/0219472 A1 | 8/2014 | Huang et al. |
| 2014/0244013 A1 | 8/2014 | Reilly |
| 2014/0249817 A1 | 9/2014 | Hart et al. |
| 2014/0252386 A1 | 9/2014 | Ito et al. |
| 2014/0254805 A1 | 9/2014 | Su et al. |
| 2014/0258292 A1 | 9/2014 | Thramann et al. |
| 2014/0270282 A1 | 9/2014 | Tammi et al. |
| 2014/0274185 A1 | 9/2014 | Luna et al. |
| 2014/0274203 A1 | 9/2014 | Ganong, III et al. |
| 2014/0277650 A1 | 9/2014 | Zurek et al. |
| 2014/0291642 A1 | 10/2014 | Watabe et al. |
| 2014/0340888 A1 | 11/2014 | Ishisone et al. |
| 2014/0363022 A1 | 12/2014 | Dizon et al. |
| 2014/0369491 A1 | 12/2014 | Kloberdans et al. |
| 2014/0372109 A1 | 12/2014 | Iyer et al. |
| 2015/0010169 A1 | 1/2015 | Popova et al. |
| 2015/0014680 A1 | 1/2015 | Yamazaki et al. |
| 2015/0016642 A1 | 1/2015 | Walsh et al. |
| 2015/0036831 A1 | 2/2015 | Klippel |

(56) References Cited

U.S. PATENT DOCUMENTS

| | | |
|---|---|---|
| 2015/0063580 A1 | 3/2015 | Huang et al. |
| 2015/0086034 A1 | 3/2015 | Lombardi et al. |
| 2015/0104037 A1 | 4/2015 | Lee et al. |
| 2015/0106085 A1 | 4/2015 | Lindahl |
| 2015/0110294 A1 | 4/2015 | Chen et al. |
| 2015/0112672 A1 | 4/2015 | Giacobello et al. |
| 2015/0154976 A1 | 6/2015 | Mutagi |
| 2015/0169279 A1 | 6/2015 | Duga |
| 2015/0170645 A1 | 6/2015 | Di Censo et al. |
| 2015/0180432 A1 | 6/2015 | Gao et al. |
| 2015/0181318 A1 | 6/2015 | Gautama et al. |
| 2015/0189438 A1 | 7/2015 | Hampiholi et al. |
| 2015/0200454 A1 | 7/2015 | Heusdens et al. |
| 2015/0221678 A1 | 8/2015 | Yamazaki et al. |
| 2015/0222987 A1 | 8/2015 | Angel, Jr. et al. |
| 2015/0228274 A1 | 8/2015 | Leppänen et al. |
| 2015/0228803 A1 | 8/2015 | Koezuka et al. |
| 2015/0237406 A1 | 8/2015 | Ochoa et al. |
| 2015/0249889 A1 | 9/2015 | Iyer et al. |
| 2015/0253292 A1 | 9/2015 | Larkin et al. |
| 2015/0253960 A1 | 9/2015 | Lin et al. |
| 2015/0263174 A1 | 9/2015 | Yamazaki et al. |
| 2015/0271593 A1 | 9/2015 | Sun et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0319529 A1 | 11/2015 | Klippel |
| 2015/0338917 A1 | 11/2015 | Steiner et al. |
| 2015/0341406 A1 | 11/2015 | Rockefeller et al. |
| 2015/0346845 A1 | 12/2015 | Di Censo et al. |
| 2015/0363061 A1 | 12/2015 | De Nigris, III et al. |
| 2015/0363401 A1 | 12/2015 | Chen et al. |
| 2015/0371657 A1 | 12/2015 | Gao et al. |
| 2015/0380010 A1 | 12/2015 | Srinivasan et al. |
| 2016/0007116 A1 | 1/2016 | Holman |
| 2016/0021458 A1 | 1/2016 | Johnson et al. |
| 2016/0029142 A1 | 1/2016 | Isaac et al. |
| 2016/0035321 A1 | 2/2016 | Cho et al. |
| 2016/0036962 A1 | 2/2016 | Rand et al. |
| 2016/0042748 A1 | 2/2016 | Jain et al. |
| 2016/0044151 A1 | 2/2016 | Shoemaker et al. |
| 2016/0057522 A1 | 2/2016 | Choisel et al. |
| 2016/0077710 A1 | 3/2016 | Lewis et al. |
| 2016/0088036 A1 | 3/2016 | Corbin et al. |
| 2016/0088392 A1 | 3/2016 | Huttunen et al. |
| 2016/0093304 A1 | 3/2016 | Kim et al. |
| 2016/0094917 A1 | 3/2016 | Wilk et al. |
| 2016/0098393 A1 | 4/2016 | Hebert |
| 2016/0111110 A1 | 4/2016 | Gautama et al. |
| 2016/0134982 A1 | 5/2016 | Iyer |
| 2016/0155443 A1 | 6/2016 | Khan et al. |
| 2016/0157035 A1 | 6/2016 | Russell et al. |
| 2016/0173578 A1 | 6/2016 | Sharma et al. |
| 2016/0173983 A1 | 6/2016 | Berthelsen et al. |
| 2016/0189716 A1 | 6/2016 | Lindahl et al. |
| 2016/0212538 A1 | 7/2016 | Fullam et al. |
| 2016/0225385 A1 | 8/2016 | Hammarqvist |
| 2016/0232451 A1 | 8/2016 | Scherzer |
| 2016/0234204 A1* | 8/2016 | Rishi ................ G06F 21/31 |
| 2016/0239255 A1 | 8/2016 | Chavez et al. |
| 2016/0260431 A1 | 9/2016 | Newendorp et al. |
| 2016/0302018 A1 | 10/2016 | Russell et al. |
| 2016/0314782 A1 | 10/2016 | Klimanis |
| 2016/0336519 A1 | 11/2016 | Seo et al. |
| 2016/0343866 A1 | 11/2016 | Koezuka et al. |
| 2016/0343949 A1 | 11/2016 | Seo et al. |
| 2016/0343954 A1 | 11/2016 | Seo et al. |
| 2016/0345114 A1 | 11/2016 | Hanna et al. |
| 2016/0352915 A1 | 12/2016 | Gautama |
| 2016/0353218 A1 | 12/2016 | Starobin et al. |
| 2016/0366515 A1 | 12/2016 | Mendes et al. |
| 2016/0372688 A1 | 12/2016 | Seo et al. |
| 2017/0003931 A1 | 1/2017 | Dvortsov et al. |
| 2017/0012207 A1 | 1/2017 | Seo et al. |
| 2017/0012232 A1 | 1/2017 | Kataishi et al. |
| 2017/0019732 A1 | 1/2017 | Mendes et al. |
| 2017/0025615 A1 | 1/2017 | Seo et al. |
| 2017/0025630 A1 | 1/2017 | Seo et al. |
| 2017/0026769 A1 | 1/2017 | Patel |
| 2017/0060526 A1 | 3/2017 | Barton et al. |
| 2017/0062734 A1 | 3/2017 | Suzuki et al. |
| 2017/0070478 A1 | 3/2017 | Park et al. |
| 2017/0076720 A1 | 3/2017 | Gopalan et al. |
| 2017/0078824 A1 | 3/2017 | Heo |
| 2017/0083285 A1 | 3/2017 | Meyers et al. |
| 2017/0084292 A1 | 3/2017 | Yoo |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0092889 A1 | 3/2017 | Seo et al. |
| 2017/0092890 A1 | 3/2017 | Seo et al. |
| 2017/0103755 A1 | 4/2017 | Jeon et al. |
| 2017/0110144 A1 | 4/2017 | Sharifi et al. |
| 2017/0117497 A1 | 4/2017 | Seo et al. |
| 2017/0123251 A1 | 5/2017 | Nakada et al. |
| 2017/0125037 A1 | 5/2017 | Shin |
| 2017/0125456 A1 | 5/2017 | Kasahara |
| 2017/0140748 A1 | 5/2017 | Roberts et al. |
| 2017/0140759 A1 | 5/2017 | Kumar et al. |
| 2017/0177585 A1 | 6/2017 | Rodger et al. |
| 2017/0178662 A1 | 6/2017 | Ayrapetian et al. |
| 2017/0188150 A1 | 6/2017 | Brunet et al. |
| 2017/0193999 A1 | 7/2017 | Aleksic et al. |
| 2017/0206896 A1 | 7/2017 | Ko et al. |
| 2017/0214996 A1 | 7/2017 | Yeo |
| 2017/0236512 A1 | 8/2017 | Williams et al. |
| 2017/0242651 A1 | 8/2017 | Lang et al. |
| 2017/0242653 A1 | 8/2017 | Lang et al. |
| 2017/0243576 A1 | 8/2017 | Millington et al. |
| 2017/0243587 A1 | 8/2017 | Plagge et al. |
| 2017/0245076 A1 | 8/2017 | Kusano et al. |
| 2017/0257686 A1 | 9/2017 | Gautama et al. |
| 2017/0270919 A1 | 9/2017 | Parthasarathi et al. |
| 2017/0287485 A1 | 10/2017 | Civelli et al. |
| 2017/0353789 A1 | 12/2017 | Kim et al. |
| 2018/0033428 A1 | 2/2018 | Kim et al. |
| 2018/0040324 A1 | 2/2018 | Wilberding et al. |
| 2018/0062871 A1 | 3/2018 | Jones et al. |
| 2018/0091913 A1 | 3/2018 | Hartung et al. |
| 2018/0130469 A1 | 5/2018 | Gruenstein et al. |
| 2018/0137861 A1 | 5/2018 | Ogawa et al. |
| 2018/0233136 A1 | 8/2018 | Torok et al. |

FOREIGN PATENT DOCUMENTS

| | | |
|---|---|---|
| CN | 103546616 A | 1/2014 |
| EP | 1349146 A1 | 10/2003 |
| EP | 1389853 A1 | 2/2004 |
| EP | 2683147 A1 | 1/2014 |
| EP | 2351021 B1 | 9/2017 |
| JP | 2008079256 A | 4/2008 |
| JP | 2008158868 A | 7/2008 |
| WO | 200153994 | 7/2001 |
| WO | 2003093950 A2 | 11/2003 |
| WO | 2015178950 A1 | 11/2015 |
| WO | 2016014142 A1 | 1/2016 |
| WO | 2016022926 A1 | 2/2016 |
| WO | 2016033364 A1 | 3/2016 |
| WO | 2016057268 A1 | 4/2016 |
| WO | 2017039632 A1 | 3/2017 |

OTHER PUBLICATIONS

Notice of Allowance dated Nov. 14, 2018, issued in connection with U.S. Appl. No. 15/297,627, filed Oct. 19, 2016, 5 pages.
Notice of Allowance dated Dec. 15, 2017, issued in connection with U.S. Appl. No. 15/223,218, filed Jul. 29, 2016, 7 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Sep. 17, 2018, issued in connection with U.S. Appl. No. 15/211,689, filed Jul. 15, 2016, 6 pages.

(56) References Cited

OTHER PUBLICATIONS

Notice of Allowance dated Dec. 19, 2018, issued in connection with U.S. Appl. No. 15/818,051, filed Nov. 20, 2017, 9 pages.
Notice of Allowance dated Jul. 19, 2018, issued in connection with U.S. Appl. No. 15/681,937, filed Aug. 21, 2017, 7 pages.
Notice of Allowance dated Mar. 20, 2018, issued in connection with U.S. Appl. No. 15/784,952, filed Oct. 16, 2017, 7 pages.
Notice of Allowance dated Sep. 20, 2018, issued in connection with U.S. Appl. No. 15/946,599, filed Apr. 5, 2018, 7 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Dec. 29, 2017, issued in connection with U.S. Appl. No. 15/131,776, filed Apr. 18, 2016, 13 pages.
Notice of Allowance dated Jul. 30, 2018, issued in connection with U.S. Appl. No. 15/098,718, filed Apr. 14, 2016, 5 pages.
Notice of Allowance dated Nov. 30, 2018, issued in connection with U.S. Appl. No. 15/438,725, filed Feb. 21, 2017, 5 pages.
Notice of Allowance dated Oct. 5, 2018, issued in connection with U.S. Appl. No. 15/211,748, filed Jul. 15, 2018, 10 pages.
Notice of Allowance dated Aug. 9, 2018, issued in connection with U.S. Appl. No. 15/229,868, filed Aug. 5, 2016, 11 pages.
Notice of Allowance dated Mar. 9, 2018, issued in connection with U.S. Appl. No. 15/584,782, filed May 2, 2017, 8 pages.
Palm, Inc., "Handbook for the Palm VII Handheld," May 2000, 311 pages.
Presentations at WinHEC 2000, May 2000, 138 pages.
Restriction Requirement dated Aug. 9, 2018, issued in connection with U.S. Appl. No. 15/717,621, filed Sep. 27, 2017, 8 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Tweet: "How to start using Google app voice commands to make your life easier Share This Story shop @Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
United States Patent and Trademark Office, U.S. Appl. No. 60/490,768 filed Jul. 28, 2003, entitled "Method for synchronizing audio playback between multiple networked devices," 13 pages.
United States Patent and Trademark Office, U.S. Appl. No. 60/825,407 filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.

Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Non-Final Office Action dated Sep. 10, 2018, issued in connection with U.S. Appl. No. 15/670,361, filed Aug. 7, 2017, 17 pages.
Non-Final Office Action dated Dec. 12, 2016, issued in connection with U.S. Appl. No. 15/098,718, filed Apr. 14, 2016, 11 pages.
Non-Final Office Action dated Jan. 13, 2017, issued in connection with U.S. Appl. No. 15/098,805, filed Apr. 14, 2016, 11 pages.
Non-Final Office Action dated Nov. 13, 2018, issued in coonnection with U.S. Appl. No. 15/717,621, filed Sep. 27, 2017, 23 pages.
Non-Final Office Action dated Nov. 13, 2018, issued in connection with U.S. Appl. No. 16/160,107, filed Oct. 15, 2018, 8 pages.
Non-Final Office Action dated Sep. 14, 2017, issued in connection with U.S. Appl. No. 15/178,180, filed Jun. 9, 2016, 16 pages.
Non-Final Office Action dated Sep. 14, 2018, issued in connection with U.S. Appl. No. 15/959,907, filed Apr. 23, 2018, 15 pages.
Non-Final Office Action dated Jan. 15, 2019, issued in connection with U.S. Appl. No. 16/173,797, filed Oct. 29, 2018, 6 pages.
Non-Final Office Action dated Mar. 16, 2018, issued in connection with U.S. Appl. No. 15/681,937, filed Aug. 21, 2017, 5 pages.
Non-Final Office Action dated Oct. 16, 2018, issued in connection with U.S. Appl. No. 15/131,254, filed Apr. 18, 2016, 16 pages.
Non-Final Office Action dated Apr. 18, 2018, issued in connection with U.S. Appl. No. 15/811,468, filed Nov. 13, 2017, 14 pages.
Non-Final Office Action dated Jan. 18, 2019, issued in connection with U.S. Appl. No. 15/721,141, filed Sep. 29, 2017, 18 pages.
Non-Final Office Action dated Apr. 19, 2017, issued in connection with U.S. Appl. No. 15/131,776, filed Apr. 18, 2016, 12 pages.
Non-Final Office Action dated Feb. 20, 2018, issued in connection with U.S. Appl. No. 15/211,748, filed Jul. 15, 2016, 31 pages.
Non-Final Office Action dated May 22, 2018, issued in connection with U.S. Appl. No. 15/946,599, filed Apr. 5, 2018, 19 pages.
Non-Final Office Action dated Aug. 24, 2017, issued in connection with U.S. Appl. No. 15/297,627, filed Oct. 19, 2016, 13 pages.
Non-Final Office Action dated Jul. 25, 2017, issued in connection with U.S. Appl. No. 15/273,679, filed Jul. 22, 2016, 11 pages.
Non-Final Office Action dated Dec. 26, 2018, issued in connection with U.S. Appl. No. 16/154,469, filed Oct. 8, 2018, 7 pages.
Non-Final Office Action dated Jan. 26, 2017, issued in connection with U.S. Appl. No. 15/098,867, filed Apr. 14, 2016, 16 pages.
Non-Final Office Action dated Oct. 26, 2017, issued in connection with U.S. Appl. No. 15/438,744, filed Feb. 21, 2017, 12 pages.
Non-Final Office Action dated Jun. 27, 2018, issued in connection with U.S. Appl. No. 15/438,749, filed Feb. 21, 2017, 16 pages.
Non-Final Office Action dated Jun. 30, 2017, issued in connection with U.S. Appl. No. 15/277,810, filed Sep. 27, 2016, 13 pages.
Non-Final Office Action dated Jan. 4, 2019, issued in connection with U.S. Appl. No. 15/948,541, filed Apr. 9, 2018, 6 pages.

(56) References Cited

OTHER PUBLICATIONS

Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Sep. 6, 2017, issued in connection with U.S. Appl. No. 15/131,254, filed Apr. 18, 2016, 13 pages.
Non-Final Office Action dated Sep. 6, 2018, issued in connection with U.S. Appl. No. 15/098,760, filed Apr. 14, 2016, 29 pages.
Non-Final Office Action dated Apr. 9, 2018, issued in connection with U.S. Appl. No. 15/804,776, filed Nov. 6, 2017, 18 pages.
Non-Final Office Action dated May 9, 2018, issued in connection with U.S. Appl. No. 15/818,051, filed Nov. 20, 2017, 22 pages.
Notice of Allowance dated Dec. 4, 2017, issued in connection with U.S. Appl. No. 15/277,810, filed Sep. 27, 2016, 5 pages.
Notice of Allowance dated Jul. 5, 2018, issued in connection with U.S. Appl. No. 15/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Aug. 1, 2018, issued in connection with U.S. Appl. No. 15/297,627, filed Oct. 19, 2016, 9 pages.
Notice of Allowance dated Apr. 11, 2018, issued in connection with U.S. Appl. No. 15/719,454, filed Sep. 28, 2017, 15 pages.
Notice of Allowance dated Dec. 12, 2018, issued in connection with U.S. Appl. No. 15/811,468, filed Nov. 13, 2017, 9 pages.
Notice of Allowance dated Jul. 12, 2017, issued in connection with U.S. Appl. No. 15/098,805, filed Apr. 14, 2016, 8 pages.
Notice of Allowance dated Sep. 12, 2018, issued in connection with U.S. Appl. No. 15/438,744, filed Feb. 21, 2017, 15 pages.
Notice of Allowance dated Dec. 13, 2017, issued in connection with U.S. Appl. No. 15/784,952, filed Oct. 16, 2017, 9 pages.
Notice of Allowance dated Aug. 14, 2017, issued in connection with U.S. Appl. No. 15/098,867, filed Apr. 14, 2016, 10 pages.
Notice of Allowance dated Feb. 14, 2017, issued in connection with U.S. Appl. No. 15/229,855, filed Aug. 5, 2016, 11 pages.
Notice of Allowance dated Jun. 14, 2017, issued in connection with U.S. Appl. No. 15/282,554, filed Sep. 30, 2016, 11 pages.
Advisory Action dated Jun. 28, 2018, issued in connection with U.S. Appl. No. 15/438,744, filed Feb. 21, 2017, 3 pages.
Advisory Action dated Dec. 31, 2018, issued in connection with U.S. Appl. No. 15/804,776, filed Nov. 6, 2017, 4 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Examination Report dated Oct. 30, 2018, issued in connection with Australian Application No. 2017222436, 3 pages.
"Automatic Parameter Tying in Neural Networks" ICLR 2018, 14 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Office Action dated Nov. 14, 2018, issued in connection with Canadian Application No. 3015491, 3 pages.
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
European Patent Office, European Extended Search Report dated Jan. 3, 2019, issued in connection with European Application No. 177570702, 8 pages.
European Patent Office, European Extended Search Report dated Jan. 3, 2019, issued in connection with European Application No. 17757075.1, 9 pages.

European Patent Office, European Extended Search Report dated Oct. 30, 2017, issued in connection with EP Application No. 17174435.2, 11 pages.
European Patent Office, European Office Action dated Jan. 22, 2019, issued in connection with European Application No. 17174435.2, 9 pages.
Final Office Action dated Oct. 6, 2017, issued in connection with U.S. Appl. No. 15/098,760, filed Apr. 14, 2016, 25 pages.
Final Office Action dated Aug. 11, 2017, issued in connection with U.S. Appl. No. 15/131,776, filed Apr. 18, 2016, 7 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Final Office Action dated Jun. 15, 2017, issued in connection with U.S. Appl. No. 15/098,718, filed Apr. 14, 2016, 15 pages.
Final Office Action dated Oct. 15, 2018, issued in connection with U.S. Appl. No. 15/804,776, filed Nov. 6, 2017, 18 pages.
Final Office Action dated Oct. 16, 2018, issued in connection with U.S. Appl. No. 15/438,725, filed Feb. 21, 2017, 10 pages.
Final Office Action dated Feb. 21, 2018, issued in connection with U.S. Appl. No. 15/297,627, filed Oct. 19, 2016, 12 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
Han et al. "Deep Compression: Compressing Deep Neural Networks with Pruning, Trained Quantization and Huffman Coding." ICLR 2016, Feb. 15, 2016, 14 pages.
Helwani et al "Source-domain adaptive filtering for MIMO systems with application to acoustic echo cancellation", Acoustics Speech and Signal Processing, 2010 IEEE International Conference, Mar. 14, 2010, 4 pages.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
International Bureau, International Preliminary Report on Patentability, dated Sep. 7, 2018, issued in connection with International Application No. PCT/US2017/018728, filed on Feb. 21, 2017, 8 pages.
International Bureau, International Preliminary Report on Patentability, dated Sep. 7, 2018, issued in connection with International Application No. PCT/US2017/018739, filed on Feb. 21, 2017, 7 pages.
International Searching Authority, International Search Report and Written Opinion dated Dec. 19, 2018, in connection with International Application No. PCT/US2018/053517, 13 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated Jan. 23, 2018, issued in connection with International Application No. PCT/US2017/57220, filed on Oct. 18, 2017, 8 pages.
International Searching Authority, International Search Report and Written Opinion dated May 23, 2017, issued in connection with International Application No. PCT/US2017/018739, Filed on Feb. 21, 2017, 10 pages.

(56) References Cited

OTHER PUBLICATIONS

International Searching Authority, International Search Report and Written Opinion dated Oct. 23, 2017, issued in connection with International Application No. PCT/US2017/042170, filed on Jul. 14, 2017, 15 pages.

International Searching Authority, International Search Report and Written Opinion dated Oct. 24, 2017, issued in connection with International Application No. PCT/US2017/042227, filed on Jul. 14, 2017, 16 pages.

International Searching Authority, International Search Report and Written Opinion dated May 30, 2017, issued in connection with International Application No. PCT/US2017/018728, Filed on Feb. 21, 2017, 11 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 retrieved Jun. 18, 2014, 2 pages.

Jose Alvarez and Mathieu Salzmann "Compression-aware Training of Deep Networks" 31st Conference on Neural Information Processing Systems, Nov. 13, 2017, 12pages.

Louderback, Jim, "Affordable Audio Receiver Furnishes Homes With MP3," TechTV Vault. Jun. 28, 2000 retrieved Jul. 10, 2014, 2 pages.

Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.

Morales-Cordovilla et al. "Room Localization for Distant Speech Recognition," Proceedings of Interspeech 2014, Sep. 14, 2014, 4 pages.

Newman, Jared. "Chromecast Audio's multi-room support has arrived," Dec. 11, 2015, https://www.pcworld.com/article/3014204/customer-electronic/chromcase-audio-s-multi-room-support-has . . . , 2 page.

Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.

\* cited by examiner

VOICE CONTROLLED MEDIA PLAYBACK SYSTEM

CROSS-REFERENCE TO RELATED APPLICATIONS

The present application is a continuation of U.S. application Ser. No. 15/131,776, filed Apr. 18, 2016, titled "Voice-Controlled Media Playback System Based on User Profile," which is currently pending; U.S. application Ser. No. 15/131,776 claims priority to (i) U.S. Provisional App. 62/298,433, filed Feb. 22, 2016, titled "Room-corrected Voice Detection," and which has expired; (ii) U.S. Provisional App. 62/298,439, filed Feb. 22, 2016, titled "Content Mixing," and which has expired; (iii) U.S. Provisional App. 62/298,425, filed Feb. 22, 2016, titled "Music Service Selection," and which has expired; (iv) U.S. Provisional App. 62/298,350, filed Feb. 22, 2016, titled "Metadata exchange involving a networked playback system and a networked microphone system," and which has expired; (v) U.S. Provisional App. 62/298,388, filed Feb. 22, 2016, titled "Handling of loss of pairing between networked devices," and which has expired; and (vi) U.S. Provisional App. 62/298,393, filed Feb. 22, 2016, titled "Action based on User ID," and which has expired. The entire contents of the Ser. No. 15/131,776; 62/298,433; 62/298,439; 62/298,425; 62/298,350; 62/298,388; and 62/298,393 applications are incorporated herein by reference. This application also incorporates herein by reference the entire contents of (i) U.S. Provisional App. 62/298,410, filed Feb. 22, 2016, titled "Default Playback Device(s)"; (ii) U.S. Provisional App. 62/298,418, filed Feb. 22, 2016, titled "Audio Response Playback"; and (iii) U.S. Provisional App. 62/312,350, filed Mar. 23, 2016, titled "Voice Control of a Media Playback System."

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
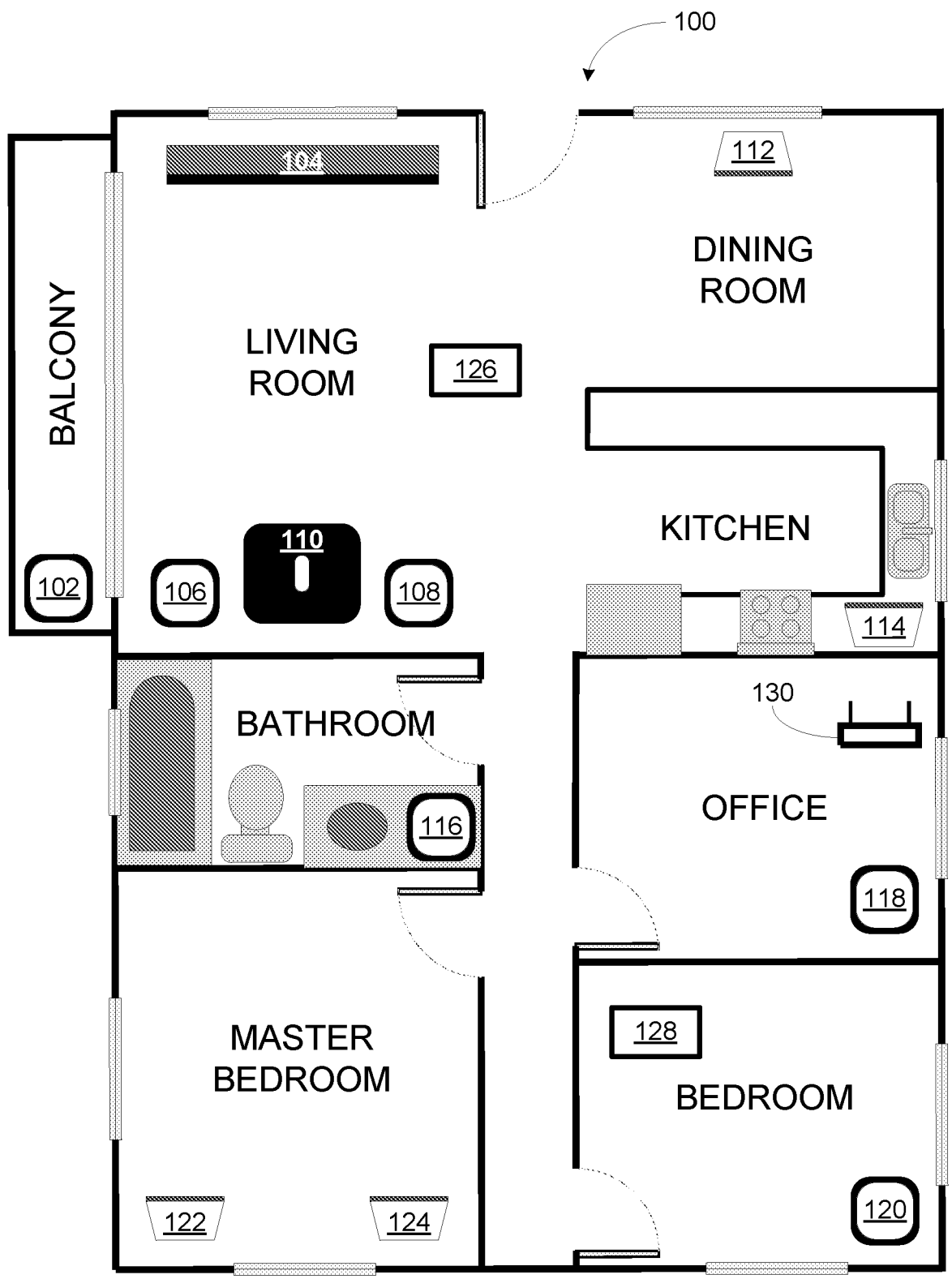
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Listening to media content out loud can be a social activity that involves family, friends, and guests. Media content may include, for instance, talk radio, books, audio from television, music stored on a local drive, music from media sources (e.g. Pandora® Radio, Spotify®, Slacker®, Radio, Google Play™, iTunes Radio), and other audible material. In a household, for example, people may play music out loud at parties and other social gatherings. In such an environment, people may wish to play the music in one listening zone or multiple listening zones simultaneously, such that the music in each listening zone may be synchronized, without audible echoes or glitches. Such an experience may be further enriched when people can use voice commands to control an audio playback device or system. For example, a person may wish to change the audio content, playlist, or listening zone, add a music track to a playlist or playback queue, or change a playback setting (e.g. play, pause, next track, previous track, playback volume, and EQ settings, among others).

Listening to media content out loud can also be an individual experience. For example, an individual may play music out loud for themselves in the morning before work, during a workout, in the evening during dinner, or at other times throughout the day at home or at work. For these individual experiences, the individual may choose to limit the playback of audio content to a single listening zone or area. Such an experience may be further enriched when an individual can use a voice command to choose a listening zone, audio content, and playback settings, among other settings.

Identifying the person trying to execute the voice command can also be an important element of the experience. It may be desirable to execute a voice command based on who the person is and what the person wants the media playback device or system to do. By way of illustration, at a party or a social gathering in a household, the host or household owner may want to prevent certain guests from using a voice command to change the audio content, listening zone, or playback settings. In some cases, the host or household owner may want to allow certain guests to use voice commands to change the audio content, listening zone, or playback settings, while preventing other guests from making such changes. User identification based on user profiles or voice configuration settings can help distinguish a household owner's voice from a guest's voice.

In another example, user identification can be used to distinguish an adult's voice from a child's voice. In some cases, the household owner may want to prevent a child from using a voice command to listen to audio content inappropriate for the child. In other cases, a household owner may want to prevent a child from changing the listening zone, or playback settings. For example, the household owner may want to listen to audio content at a certain volume and prevent a child from changing the volume of the audio content. User identification may help set parental control settings or restriction settings that would prevent a child from accessing certain content or changing the listening zone, or playback settings. For example, user identification based on user profiles or voice configuration settings may help determine who the child is, what the child is allowed to listen to, or what settings the child is allowed to change.

In yet another example, user identification may be used to prevent unintentional voice commands. For example, the household owner may want to prevent audio from the television or any other audio content from unintentionally triggering a voice command. Many other examples, similar and different from the above, are described herein and illustrate different types of actions based on voice recognition.

Some embodiments described herein include a media playback system (or perhaps one or more components thereof) receiving a voice command and determining an appropriate action for the media playback system to execute based on user identification.

One aspect includes receiving a voice command for a media playback system. In some embodiments, the media playback system includes one or more media playback devices alone or in combination with a computing device, such as a media playback system server. In some embodiments, the media playback system may include or communicate with a networked microphone system server and one or more network microphone devices (NMDs). In some embodiments, the media playback system server and/or the networked microphone system server may be cloud-based server systems. Any one or a combination of these devices and/or servers may receive a voice command for the media playback system.

In some embodiments, one or more functions may be performed by the networked microphone system individually or in combination with the media playback system. In some embodiments, receiving a voice command includes the networked microphone system receiving a voice command via one or more of NMDs, and transmitting the voice command to the media playback system for further processing. In some embodiments, the media playback system may then convert the voice command to an equivalent text command, and parse the text command to identify a command. In some embodiments, the networked microphone system may convert the voice command to an equivalent text command and transmit the text command to the media playback system to parse the text command and identify a command.

A voice command may be a command to control any of the media playback system controls discussed herein. For example, in some embodiments, the voice command may be a command for the media playback system to play media content via one or more playback devices of the media playback system. In some embodiments, the voice command may be a command to modify a playback setting for one or more media playback devices of the media playback system. Playback settings may include, for example, playback volume, playback transport controls, music source selection, and grouping, among other possibilities.

After receiving a voice command, the computing device of the media playback system determines whether the voice command was received from a registered user of the media playback system. In some embodiments, the media playback system may be registered to a particular user or one or more users in a household. In some embodiments, the computing device of the media playback system may be configured to link or associate a voice command to a registered user based on user profiles stored in the computing device. A registered user or users may have created a user profile stored in the computing device. The user profile may contain information specific to the user. For example, the user profile may contain information about the user's age, location, preferred playback settings, preferred playlists, preferred audio content, access restrictions set on the user, and information identifying the user's voice, among other possibilities.

In some embodiments, the computing device of the media playback system may be configured to link or associate a voice command to a user based on voice configuration settings set by a user. In some embodiments, the media playback system may ask a user to provide voice inputs or a series of voice inputs. The computing device of the media playback system may then process the voice inputs, associate the voice inputs to the user, and store the information so that the media playback system can recognize voice commands from the user.

In some embodiments, the computing device of the media playback system may be configured to determine a confidence level associated with a voice command, which may further help determine that the voice command was received from a registered user. A confidence level may be determined based on user history, location, individually or in combination with any other information generally found in a user profile.

In response to determining that the voice command was received from a registered user, the computing device of the media playback system may configure an instruction or a set of instructions for the media playback system. The instructions may be based on content from the voice command and information in a user profile for the registered user. Additionally or alternatively, the instructions may be based on content from the voice command and voice configuration settings stored on the computing device.

In some embodiments, the content from the voice command may include a command for one or more playback devices to play media content. In some embodiments, based on the command for one or more playback devices to play media content and information in a user profile for the registered user, the computing device of the media playback system may configure an instruction or a set of instructions to cause one or more playback devices to obtain media content from a preferred media source of a registered user. In some embodiments, based on the command for one or more playback devices to play media content and information in a user profile for the registered user, the computing device may configure an instruction or a set of instructions to cause the media playback system to play the media content via one or more playback devices of the media playback system. In some embodiments, based on the command for the one or more playback devices to play media content and information in a user profile for the registered user, the computing device may include instructions to (i) configure the one or more playback devices with one or more of the registered user's preferred playback settings and (ii) cause the one or more playback devices to play the media content via the media playback system with the registered user's preferred playback settings.

In some embodiments, the content from the voice command may include a command for one or more playback devices to play media content but may not identify a particular listening zone or playback zone of the media playback system. Based on the content from the voice command and information in a user profile for the registered user, the computing device may configure an instruction or a set of instructions to cause one or more playback devices to play the media content via one or more media playback devices within the particular playback zone of the media playback system.

In some embodiments, the content from the voice command may include a command for the media playback system to modify a playback setting. Based on the content from the voice command and information in a user profile for the registered user, the computing device may configure an instruction or a set of instructions to cause the media playback system to modify the playback setting for one or more playback devices of the media playback system.

Some embodiments include the media playback system determining an order of preference to resolve conflicting voice commands received from different users. A conflicting voice commands may be, for example, a voice command received from a user to play a song and a subsequent voice command received from another user to stop playing the song. Many other examples, similar and different from the above, are described herein. In some embodiments, the media playback system may assign an order of preference in which voice commands received from registered guests have a higher priority than nonregistered guests.

Additionally, the media playback system may take actions based on receiving a wakeup word or wakeup phrase, associated with a registered user or a registered guest user. A wakup word or wakeup phrase (e.g., "Hey Sonos") may be used to trigger a time period during which the system will accept additional commands from a user based on the specific command or wakeup word received. For example, a host or authorized guest may send a voice command to add songs to a play queue (e.g., "Hey Sonos, let's queue up songs"), which may open a time period or window (e.g., 5 minutes) for the host or authorized guest to send additional voice commands to add specific songs to a play queue. Many other examples, similar and different from the above, are described herein.

After configuring an instruction or set of instructions for the media playback system, some embodiments of the computing device may send the instruction or set of instructions to one or more playback devices of the media playback system.

Some embodiments include the computing device of the media playback system determining whether the voice command was received from a child. In some embodiments, the computing device may distinguish between an adult and a child based on information in a user profile or a guest profile. In some embodiments, the computing device may distinguish between an adult and a child based on the tone or frequency of the user's voice.

In response to determining that the voice command was received from a child, some embodiments may prevent one or more playback devices from playing given media that may be inappropriate for the child. Some embodiments may prevent the computing device and/or one or more playback devices from modifying a playback setting based on the content of a child's voice command.

Some embodiments include actions based on determining whether a voice command was received from a guest user instead of a registered user of the media playback system. In some embodiments, a registered user may have created a guest profile for the guest user. The guest profile may include any information included in a user profile. In some embodiments, the computing device of the media playback system may determine that a voice command was not received from a registered user, and may then ask the registered user if the voice command came from a guest of the registered user.

In response to determining that the voice command was received from a guest user, the computing device of the media playback system may (1) assign a restriction setting for the guest user, (2) configure an instruction for one or more playback devices based on content from the voice command and the assigned restriction setting for the guest user, and (3) send the instruction to one or more playback devices. A restriction setting may be any setting that limits the control of the media playback system.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
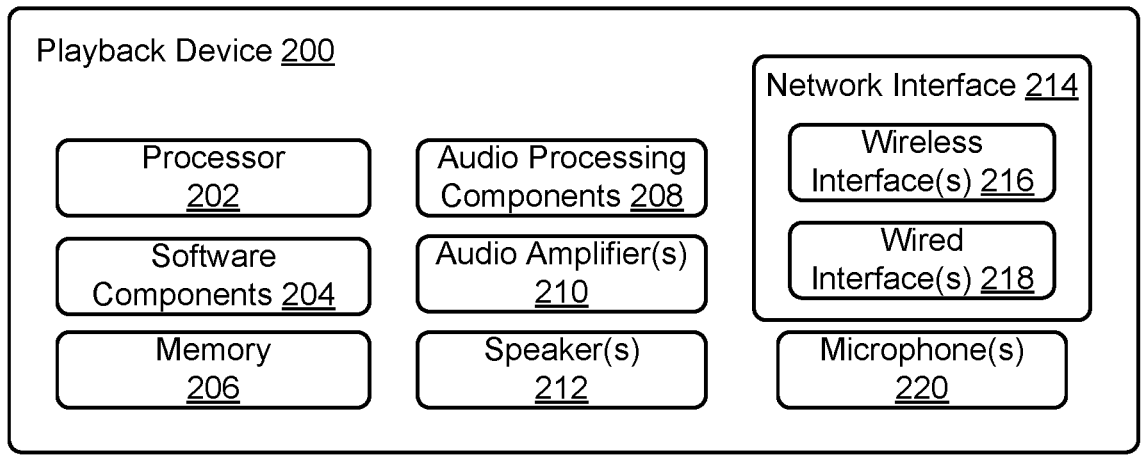
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
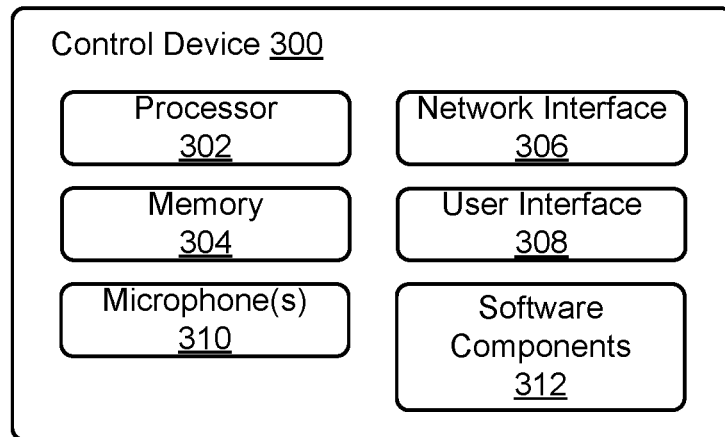
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™)

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
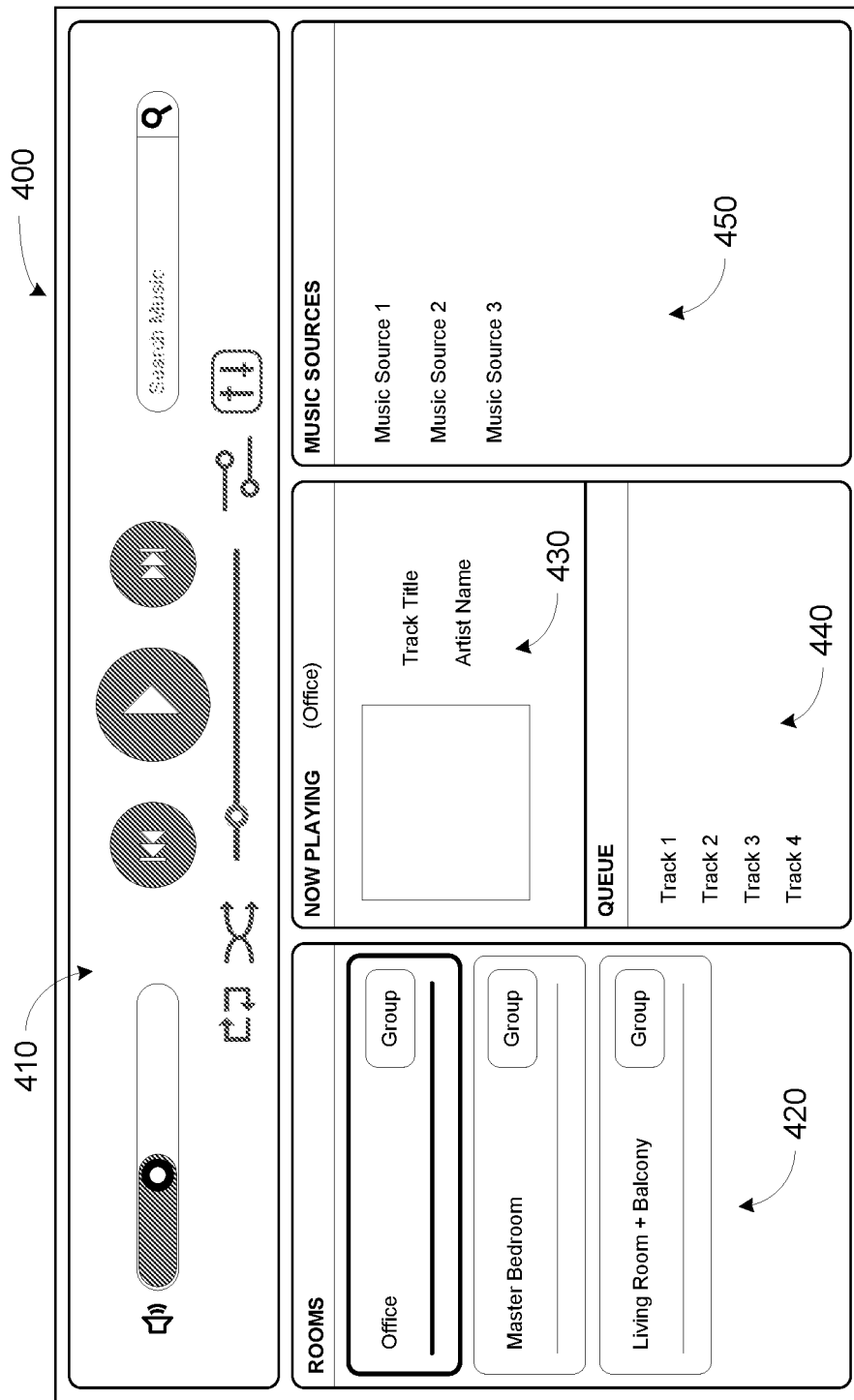
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use"

when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
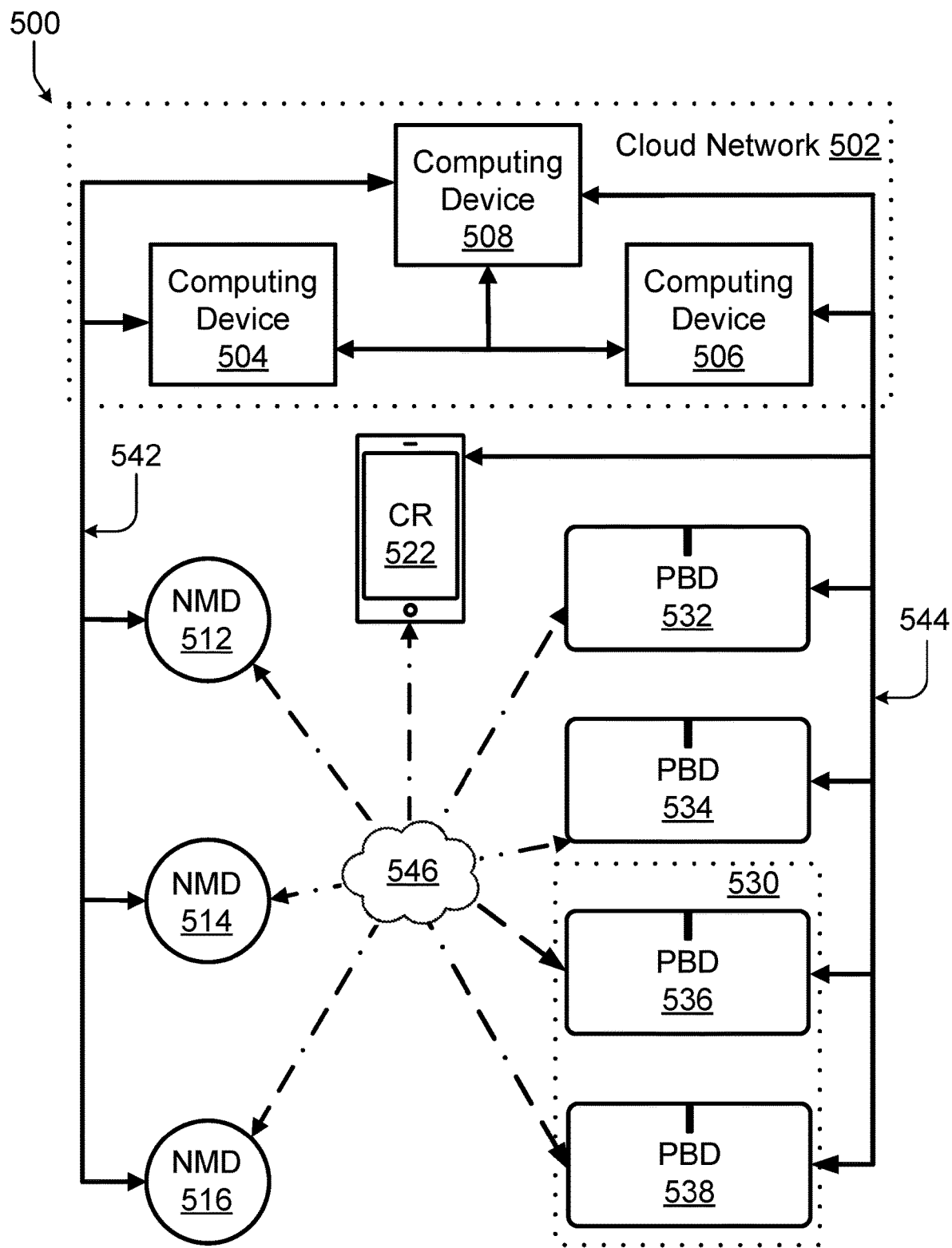
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
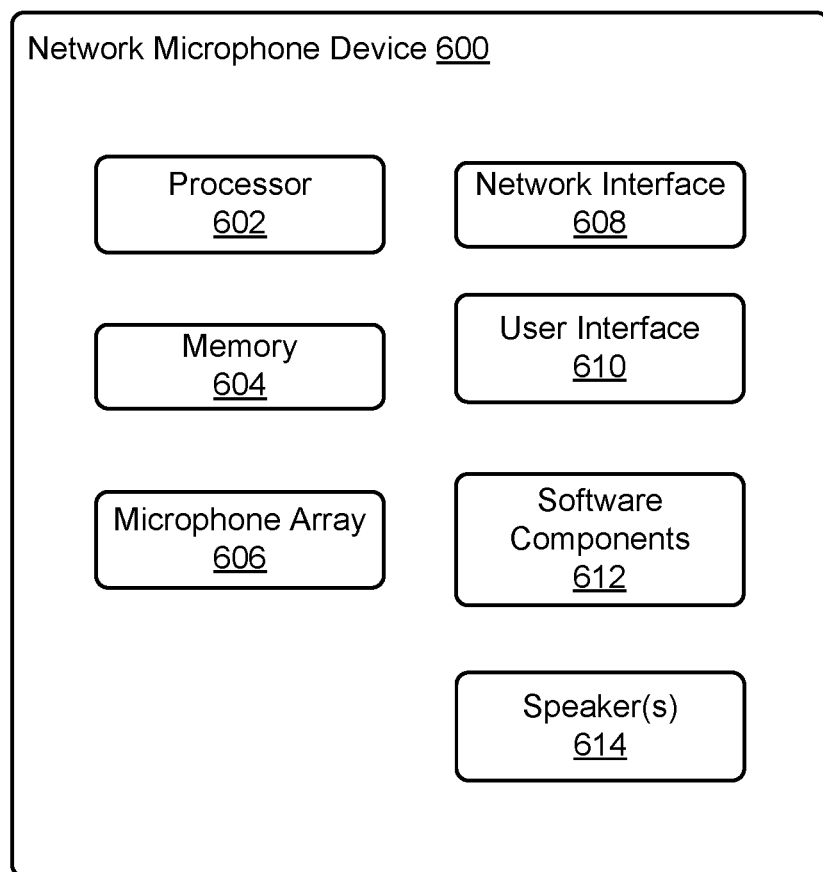
FIG. 6 shows a function block diagram of an example network microphone device.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems and Methods

To execute a voice command to control the media playback system, it is desirable in some instances for the media playback system to receive a voice command and determine an appropriate action for the media playback system to execute based on user identification (or at least based on the user who spoke the voice command). In some embodiments, the media playback system includes one or more of PBDs 532, 534, 536, and 538 and computing device 506 (which is configured as a media playback system server). In some embodiments, the media playback system may include or communicate with a networked microphone system that includes one or more of NMDs 512, 514, and 516 and computing device 504 (which is configured as a networked microphone system server).

Generally, it should be understood that one or more functions described herein may be performed by the networked microphone system individually or in combination with the media playback system. It should be further understood that one or more functions performed by the computing device 506 may be performed by CR 522 and/or one or more of PBDs 532, 534, 536, and 538 of the media playback system.

Examples of voice commands include commands to control any of the media playback system controls discussed previously. For example, in some embodiments, the voice command may be a command for the media playback system to play media content via one or more playback devices of the media playback system. In some embodiments, the voice command may be a command to trigger a time period or window in which to receive additional voice commands associated with the initial voice command. In some embodiments, the voice command may be a command to modify a playback setting for one or more media playback devices of the media playback system. Playback settings may include, for example, playback volume, playback transport controls, music source selection, and grouping, among other possibilities.

Examples of media content include, talk radio, books, audio from television, music stored on a local drive, or music from media sources, among others. Examples of media sources include Pandora®, Radio, Spotify®, Slacker®, Radio, Google Play™, and iTunes Radio, among others.

Examples of user identification include identifying a user as a registered user, a guest user, a child, or an unknown user.

Example registered users include one or more users linked or associated with the media playback system by a user profile, and/or voice configuration settings, among other possibilities. Example user profiles may include information about a user's age, location, preferred playback settings, preferred playlists, preferred audio content, access restrictions set on the user, and information identifying the user's voice, user history, among other possibilities. Example information identifying the user's voice includes the tone or frequency of a user's voice, age, gender, and user history, among other information. Example voice configuration settings may include settings that ask a user to provide voice inputs or a series of voice inputs for the media playback system to recognize and associate the user with.

Example guest users include one or more users linked or associated with the media playback system by a registered user's user profile, or a guest profile created by a registered user or a guest user with the registered user's permission. Example guest profiles may include any type of information included in a user profile.

In some embodiments, a guest with his or her own media playback system in his or her own house may have a user profile associated with his or her own media playback system stored in computing device 506, for example. In operation, when that guest arrives at the host's home and tries to use voice commands to control the host's media playback system, the computing device 506 connected to the host's playback system may be able to access user profile settings of the guest, including but not limited to (i) music services that the guest has user accounts with, (ii) the guest's playlists, (iii) whether the host has granted the guest access to control the host's media playback system, and/or (iv) perhaps other user information in the guest's user profile.

A child user may be identified by, for example, information in a user profile if the child is one of the registered users of the media playback system, information in a guest profile, and/or the tone or frequency of the user's voice.

In some embodiments, receiving a voice command includes the media playback system receiving a voice command via one or more of PBDs 532, 534, 536, and 538 and/or computing device 506 (which is configured as a media playback system server). In one example, computing device 506 may convert the voice command to an equivalent text command, and parse the text command to identify a command.

In some embodiments, one or more functions may be performed by the networked microphone system individually or in combination with the media playback system. In some embodiments, receiving a voice command includes the networked microphone system receiving a voice command via one or more of NMDs 512, 514, or 516, and transmitting the voice command to the computing device 506 and/or one or more of PBDs 532, 534, 536, and 538 for further processing. In some embodiments, the computing device 506 may convert the voice command to an equivalent text command, and parse the text command to identify a command. In some embodiments, the networked microphone system may convert the voice command to an equivalent text command and transmit the text command to the computing device 506 and/or one or more of PBDs 532, 534, 536, and 538 to parse the text command and identify a command.

After receiving a voice command, the computing device 506 and/or one or more of PBDs 532, 534, 536, and 538 determines whether the voice command was received from a registered user of the media playback system. In some embodiments, determining whether the voice command was received from a registered user may include the computing device 506 and/or one or more of PBDs 532, 534, 536, and 538 determining whether there is a user profile stored on the media playback system that is associated with the voice command. For example, the computing device 506 and/or one or more of PBDs 532, 534, 536, and 538 may try to match the voice command to information identifying a user's voice that may be included in a user profile stored on the media playback system. In some embodiments, the networked microphone system individually or in combination with the media playback system may determine whether the voice command was received from a registered user of the media playback system by communicating with computing device 506.

In some embodiments, determining whether the voice command was received from a registered user may include the computing device 506 and/or one or more of PBDs 532, 534, 536, and 538 determining whether the voice command matches the voice inputs in the media playback system's voice configuration settings. For example, a user may have previously configured the media playback system to recognize the user's voice by providing a voice input or a series of voice inputs for the media playback system to recognize and associate the user with. The voice input or series of voice inputs may be stored on the computing device 506 and/or one or more of PBDs 532, 534, 536, and 538. In some embodiments, the voice input or series of voice inputs may be stored on the networked microphone system.

In some embodiments, determining whether the voice command was received from a registered user may include the computing device 506, CR 522, and/or one or more of PBDs 532, 534, 536, and 538, individually or in combination, determining a confidence level associated with a voice command received. A confidence level may be determined based on user history, location, individually or in combination with any other information generally found in a user profile.

For example, the media playback system, may receive a first voice command from a registered user in the kitchen and determine a confidence level based on the voice command received. The media playback system may receive the first voice command from any one or more of NMDs 512-513, CR 522, and PBDs 532-538. Further, the media playback system may receive the same voice command from the registered user in another room in the user's house and determine a confidence level based on the voice command received. The media playback system may receive the second voice command from any one or more of NMDs 512-513, CR 522, and PBDs 532-538. The media playback system may then determine a new confidence level based on the received commands from different computing devices (e.g., CR 522), NMDs, and/or PBDs throughout the user's house. As a result, the media playback system may have a greater confidence level that the voice command was received from a registered user.

In another example, the media playback system may receive a voice command from a registered user and determine a confidence level based on user history. In operation, the media playback system may receive the voice command from any one or more of NMDs 512-513, CR 522, and PBDs 532-538. After receiving the voice command, computing device 506, CR 522, and/or one or more of PBDs 532, 534, 536, and 538, individually or in combination, may determine a higher confidence level if the voice command received includes an artist, playlist, genre, or any other information found in a user profile that is typically associated with the registered user. For example, if a registered user typically listens to songs by Michael Jackson, the media playback system may have a greater confidence level that a voice command to play "Thriller" by Michael Jackson was received from a registered user. Many other examples, similar and different from the above, are possible.

In some embodiments, the media playback system may build a confidence level based on a registered user's pattern of voice commands found in a user's profile. For example, the media playback system may receive a voice command from a registered user to play a particular song by Britney Spears, and determine a confidence level based on the received voice command. Every time the media playback system receives the same voice command or similar voice command, such as a command to play another song by Britney Spears, the media playback system may build a higher confidence level and thus, may have a greater confidence level that the voice command was received from a registered user.

Generally, as mentioned previously, it should be understood that one or more functions described herein may be performed by the networked microphone system individually or in combination with the media playback system. It should be further understood that one or more functions performed by the computing device 506 may be performed by CR 522 and/or one or more of PBDs 532, 534, 536, and 538 of the media playback system and/or perhaps one or more of NMDs 512, 514, and 516.

In some embodiments, determining a confidence level includes the media playback system determining a confidence level via computing device 506 (which is configured as a media playback system server), CR 522, and/or one or more of PBDs 532, 534, 536, and 538, individually or in combination with one another. For example, CR 522, and/or one or more of PBDs 532, 534, 536, and 538 may (i) determine a confidence level associated with a received voice command, (ii) determine that the voice command was received from a registered user based on the determined confidence level, and (iii) send an instruction to computing device 506 (which is configured as a media playback system server) to execute the voice command. In another example, CR 522, and/or one or more of PBDs 532, 534, 536, and 538 may (i) determine a confidence level associated with a received voice command, and (ii) send data associated with the confidence level to computing device 506 for further processing. Computing device 506 may then (i) determine that the voice command was received from a registered user based on the determined confidence level, and (ii) send an instruction to execute the voice command to CR 522, and/or one or more of PBDs 532, 534, 536, and 538.

In some embodiments, determining a confidence level includes the media playback system determining a confidence level individually or in combination with the networked microphone system. For example, the media playback system may receive a voice command via CR 522 and/or one or more of PBDs 532, 534, 536, and 538 of the media playback system and/or perhaps one or more of NMDs 512, 514, and 516. In response to the received voice command, the media playback system may send data associated with a confidence level to one or more of NMDs 512, 514, or 516. The networked microphone may then (i) determine a confidence level associated with the received data, and (ii) execute a command or send an instruction to the media playback system to execute a command. In response to determining that the voice command was received from a registered user, the computing device 506 may configure an instruction or a set of instructions for one or more PBDs of the media playback system. The instructions may be based on content from the voice command and information in a user profile for the registered user. Additionally or alternatively, the instructions may be based on content from the voice command and voice configuration settings stored on the computing device 506, one or more of PBDs 532, 534, 536, and 538, or the networked microphone system.

In some embodiments, the content from the voice command may include a command for one or more PBDs of the media playback system to play media content. In some embodiments, based on the command for the media playback system to play media content and information in a user profile for the registered user, computing device 506 may configure an instruction or a set of instructions to cause one or more of PBDs to obtain media content from a preferred media source of a registered user.

In some embodiments, based on the command for the media playback system to play media content and information in a user profile for the registered user, computing device 506 may configure an instruction or a set of instructions to cause the media playback system to play the media content via one or more PBDs of the media playback system.

In some embodiments, based on the command for the media playback system to play media content and information in a user profile for the registered user, the computing device 506 may include instructions to (i) configure the media playback system with one or more of the registered user's preferred playback settings and (ii) cause one or more PBDs to play the media content with the registered user's preferred playback settings. Preferred playback settings may be preferred playback settings stored in a registered user's user profile. Additionally or alternatively, preferred playback settings may be based on user history stored in a registered user's user profile. User history may include commonly used or previously used playback settings by the user to play media content.

In some embodiments, the content from the voice command may include a command for the media playback system to play media content but may not identify a particular listening zone or playback zone of the media playback system. Based on this content and information in a user profile for the registered user, such as user history, the computing device 506 may (i) configure an instruction or a set of instructions to cause the media playback system to play the media content via one or more PBDs within the particular playback zone of the media playback system and (ii) implement the configured instruction or set of instructions to play the media content via the one or more PBDs.

In some embodiments, the content from the voice command may include a command for the media playback system to modify a playback setting. Based on the command for the media playback system to modify a playback setting and information in a user profile for the registered user, the computing device 506 may (i) configure an instruction or a set of instructions to cause the media playback system to modify the playback setting for one or more PBDs of the media playback system and (ii) implement the configured instruction or set of instructions to modify the playback setting via the one or more PBDs.

Some embodiments include the media playback system determining whether the voice command was received from a child. In some embodiments, the computing device 506 may distinguish between an adult and a child based on information in a user profile if the child is one of the registered users of the media playback system. In some embodiments, the computing device 506 may distinguish between an adult and a child based on the tone or frequency of the user's voice.

In some embodiments, determining whether the voice command was received from a child may include the computing device 506, CR 522, and/or one or more of PBDs 532, 534, 536, and 538 (individually or in combination) determining a confidence level associated with a voice command received. As described above, a confidence level may be determined based on user history, location, individually or in combination with any other information generally found in a user profile.

For example, the media playback system may receive a voice command from an NMD or PBD located in a particular room where a child is likely to be (e.g., child's bedroom, playroom, basement, etc). Because the voice command was received from a device (an NMD or PBD) located in a room where a child is likely to be, the media playback system may have a greater confidence level that the voice command was received from a child.

In another example, the media playback system, may receive a voice command for a particular type of content, and based on the type of content, determine a higher confidence level that the voice command was received from a child. For example, if the media playback system receives a voice command to play a song from a cartoon show or movie, the media playback system may have a greater confidence level that the voice command was received from a child. Many other examples, similar and different from the above, are possible. In response to determining that the voice command was received from a child, some embodiments may prevent one or more PBDs from playing given media that may be inappropriate for the child. Some embodiments may prevent the computing device 506 and/or one or more PBDs from modifying a playback setting based on the content of a child's voice command. For example, the computing device 506 and/or one or more PBDs may disregard a child's voice command to increase the volume of one or more PBDs.

Some embodiments include the media playback device taking actions based on determining whether a voice command was received from a guest user instead of a registered user of the media playback system. In some embodiments, computing device 506 may have stored a previously created guest profile that may be associated with a particular guest. In some embodiments, computing device 506 may determine that a voice command was not received from a registered user, and may then ask the registered user if the voice command came from a guest. The registered user may then have the option to prevent the computing device 506 and/or one or more PBDs from executing all or part of the contents of the voice command.

In some embodiments, determining whether the voice command was received from a guest user may include the computing device 506, CR 522, and/or one or more of PBDs 532, 534, 536, and 538 (individually or in combination) determining a confidence level associated with a voice command received. As described above, a confidence level may be determined based on user history, location, individually or in combination with any other information generally found in a user profile.

In response to determining that the voice command was received from a guest user, the computing device 506 may (1) assign a restriction setting for the guest user, (2) configure an instruction for one or more PBDs based on content from the voice command and the assigned restriction setting for the guest user, and (3) send the instruction to one or more PBDs for execution. In some embodiments, assigning a restriction setting for a guest user may include the computing device 506 matching the voice command to a particular guest profile stored on the computing device 506 and/or one or more PBDs. The guest profile may include restriction settings, and information regarding the voice of the particular guest user, such as frequency or tone of the guest's voice, among other information described previously. A restriction setting may be any setting that limits the control of the media playback system.

Some embodiments include the media playback system determining an order of preference to resolve conflicting voice commands received from different users. A conflicting voice commands may be, for example, a voice command received from a user to play a song and a subsequent voice command received from another user to stop playing the song. Other examples are possible, such as a voice command received from a user to increase the volume of one or more PBDs 532, 534, 536, and 538, and a subsequent voice command received from another user to decrease the volume. In particular, the media playback system (via one or more of NMDs 512-516, CR 522, PBDs 532-538, and/or computing device 506) may receive a voice command from a registered user or host to play a song in a playback zone. Subsequently, the media playback system may receive a conflicting voice command from a nonregistered user or guest to stop playing the song in the playback zone. To resolve this conflict, the media playback system may apply an order of preference in which voice commands received from a registered user have a higher priority than a nonregistered user or guest.

In some embodiments, the media playback system may assign an order of preference in which voice commands received from registered guests have a higher priority than nonregistered guests. In some embodiments, voice commands received from one registered guest may have a higher priority than another registered guest. Additionally or alternatively, voice commands received from an adult may have a higher priority than a child.

In another embodiment, controller-issued commands (e.g., commands issued by CR 522 or another computing device configured to control the media playback system) received by the media playback system may have a lower priority than a registered user, but may have a higher priority than a nonregistered user or guest. In some embodiments, some registered guests may have a higher priority than controller-issued commands. Other examples of determining and assigning an order of preference are possible.

Additionally, the media playback system may take actions based on receiving a wakeup word or wakeup phrase, associated with a registered user. A wakeup word or phrase may be a specific word or phrase (e.g., "Hey, Sonos") stored in a registered user's profile. In some embodiments, different users may configure the media playback system for different wakeup words or phrases. In other embodiments, the media playback system may be configured with the same wakeup word or phrase for all (or any) users.

In some embodiments, a registered user may have a universal wakeup word or phrase that triggers a time period or window for the media playback system to receive additional voice commands associated with the wakeup word or phrase from the registered user, a guest, and/or a nonregistered user. For example, a registered user or host may send a voice command to add songs to a play queue (e.g., "Hey Sonos, let's queue up songs"), which may open a time period or window (e.g., five minutes) during which the registered user can send additional voice commands to add specific songs to the play queue (e.g., "Add Thriller by Michael Jackson"). In another example, a registered user or host may send a voice command (e.g., "Hey Sonos, open control for my house system") that authorizes all guests in a house to send voice commands to add songs to a play queue, play songs, or change the volume, among other functions for a user-defined or default time period or window, or for a specific period of time (e.g., "Hey Sonos, open control for my house system for the next 4 hours" or "Hey Sonos, open control for my house system from now until Saturday at 2 pm"). In some embodiments, a registered user or host may send a voice command (e.g., "Hey Sonos, restrict control for my living room to authorized guests") that authorizes only some of the guests to send voice commands for a time period or window to control one or more PBDs 532, 534, 536, and 538 and/or computing device 506 in a playback zone.

In some embodiments, a registered user may have a different wakeup word or phrase for different voice commands that triggers a time period or window for the media playback system to receive additional voice commands associated with the wakeup word or phrase. For example, a registered user or host may have a user-specific wakeup word or phrase to send a voice command to add songs to a play queue (e.g., "Hey Sonos, let's queue up songs" "Yo, Sonos, queue songs," "Alpha song queue," etc), and may have a different user-specific wake up word or phrase to authorize guests in a house to control the media playback device (e.g., "Hey Sonos, open access," "It's party time," etc).

In some embodiments, a registered user or host may have a user-specific or universal wakeup word or phrase to send a voice command to authorize certain guests in a house to have restricted control of the media playback system for a time period or window. U.S. Patent Pub. No. 2013/0346859 entitled, "Systems, Methods, Apparatus, and Articles of Manufacture to Provide a Crowd-Sourced Playlist with Guest Access," which is hereby incorporated by reference, provides in more detail some examples for restricted control of the media playback system.

Additionally, a registered user or host may have a user-specific or universal wakeup word or phrase to send a voice command to authorize registered guests in a house to have open control or restricted control of the media playback back system for a time period or window, while preventing nonregistered guests from having control. In some embodiments, a registered user or host may have a user-specific or universal wakeup word or phrase to send a voice command to authorize adults in a house to have open control or restricted control of the media playback system for a time period or window, while preventing children from having control. Many other examples, similar and different from the above, are possible.

In some embodiments, a registered user or host may specify the time period or window for the media playback system to receive additional voice commands. For example, a registered user or host may send a voice command (e.g., Hey, Sonos, open control for my house system for one hour") that authorizes guests to send additional voice commands to control the media playback system for the specified time period (e.g., one hour). Many other examples, similar and different from the above, are possible.

In some embodiments, a registered user or host may close or key off the time period or window for receiving additional voice commands associated with the initial wakeup word or phrase. For example, if a registered user or host speaks a voice command with a wake up word or phrase that opens a time period or window to receive additional voice commands for an hour, the registered user or host may send another voice command (e.g., "Hey Sonos, queue songs complete") to key off the one hour time period or window before the one hour time period expires. Many other examples, similar and different from the above, are possible.

In some embodiments, the media playback system may take actions based on receiving a wakeup word or wakeup phrase from a registered guest user. A registered guest user may have wakeup words or phrases stored in a guest profile. In response to determining that a wakeup word or wakeup phrase was received from a guest user, the media playback system may (i) determine whether there is a restriction setting associated with the guest user, (ii) configure an instruction for one or more PBDs based on the wakeup word or phrase and the assigned restriction setting for the guest user, and (iii) send the instruction to one or more PBDs for execution (e.g., to open a time period or window to receive additional voice commands associated with the wake up word command).

In some embodiments, the media playback system may refrain from taking actions based on receiving a wakeup word or phrase from a registered guest user if, for example, the media playback system has already received a voice command with a wakeup word or phrase from a registered user or host, and the time period or window to receive additional commands has not expired.

In some embodiments, the media playback system may take actions based on receiving a wakeup word or wakeup phrase from a registered guest user and subsequently close or key off the time period or window for receiving additional voice commands if the media playback device subsequently receives a voice command from a registered user or host. In some embodiments, the registered guest may close or key off the time period or window before it expires. In other embodiments, an adult may close or key off the time period or window before it expires if the registered guest is a child. Many other examples, similar and different from the above, are possible.

After configuring an instruction or set of instructions for the media playback system, some embodiments may send the instruction or set of instructions to one or more PBDs of the media playback system to execute the instructions. In some embodiments, the media playback system may send the instruction or set of instructions to computing device 506. In some embodiments, the media playback system may send the instruction or set of instructions to the networked microphone system.

Figure 7:
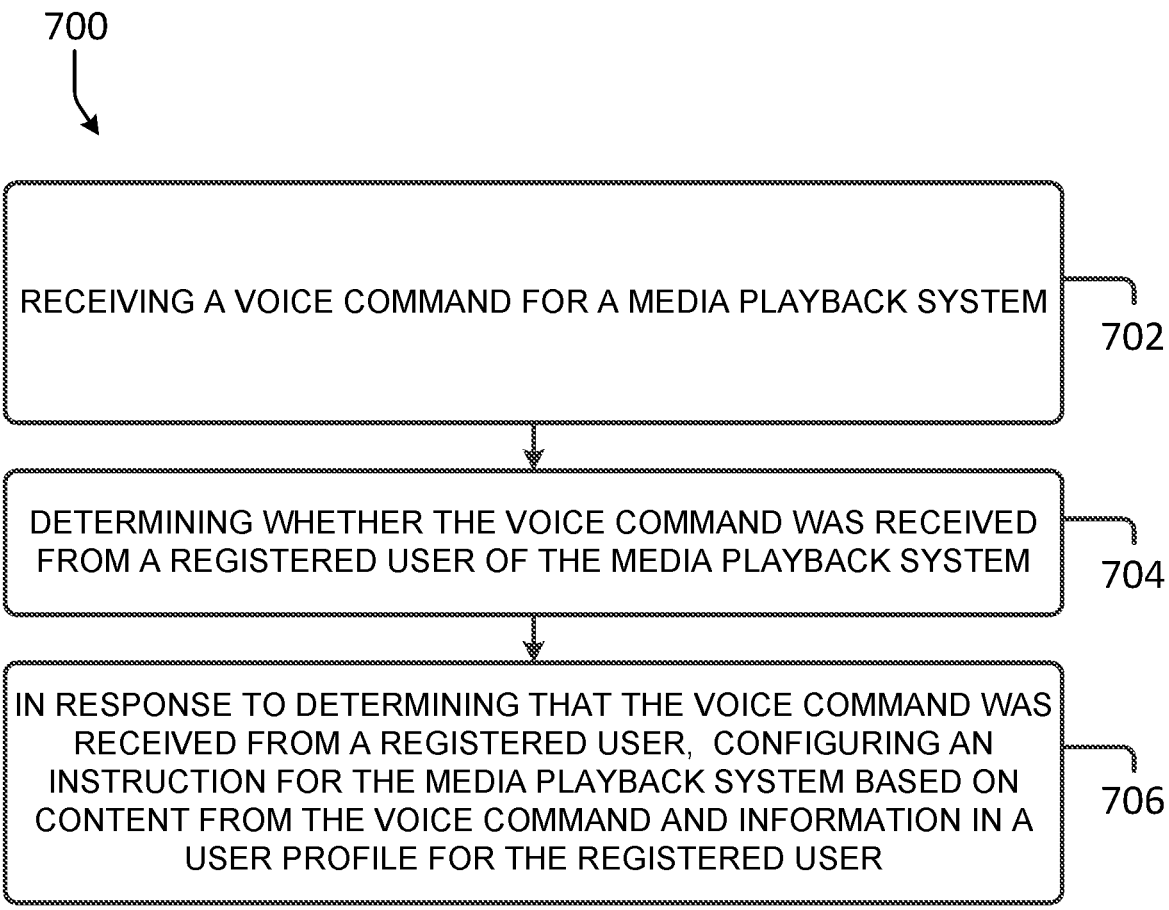
FIG. 7 shows an example method according to some embodiments.

Method 700 shown in FIG. 7 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, and/or the configuration shown in FIG. 5. Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

Method 700 begins at block 702, which includes receiving a voice command for a media playback system. In some embodiments, receiving a voice command includes the media playback system receiving a voice command via one or more of PBDs 532, 534, 536, and 538 and/or computing device 506 (which is configured as a media playback system server). In one example, the computing device 506 may convert the voice command to an equivalent text command, and parse the text command to identify a command.

In some embodiments, one or more functions may be performed by the networked microphone system individually or in combination with the media playback system. In some embodiments, receiving a voice command includes the networked microphone system receiving a voice command via one or more of NMDs 512, 514, or 516, and transmitting the voice command to computing device 506 and/or one or more of PBDs 532, 534, 536, and 538 for further processing. In some embodiments, computing device 506 and/or one or more of PBDs 532, 534, 536, and 538 may convert the voice command to an equivalent text command, and parse the text command to identify a command. In some embodiments, the networked microphone system may convert the voice command to an equivalent text command and transmit the text command to computing device 506 and/or one or more of PBDs 532, 534, 536, and 538 to parse the text command and identify a command.

Next, method 700 advances to block 704, which includes determining whether the voice command was received from a registered user of the media playback system. In some embodiments, determining whether the voice command was received from a registered user may include computing device 506 determining whether there is a user profile stored on the media playback system that is associated with the voice command. For example, computing device 506 may try to match the voice command to information identifying a user's voice in a user profile.

In some embodiments, determining whether the voice command was received from a registered user may include determining whether the voice command matches the voice inputs stored in the media playback system's voice configuration settings. For example, a user may have previously configured the media playback system to recognize the user's voice by providing a voice input or a series of voice inputs for the media playback system to recognize and associate the user with. Voice configuration settings may be stored on the computing device 506 and/or one or more of PBDs 532, 534, 536, and 538. Alternatively, the computing device 506 may communicate with the networked microphone system to store the voice configuration settings.

In some embodiments, determining whether the voice command was received from a registered user may include determining a confidence level associated with a voice command received. The confidence level may be a confidence level associated with the person who spoke the command, e.g., a confidence level that the command was received from a registered user generally, a confidence level that the command was received from a specific registered user, a confidence level that the command was received from someone other than a registered user, a confidence level that the command was received from a registered guest, a confidence level that the command was received from a child, and/or a confidence level that the command was received from a particular child. The confidence level may also be a confidence level associated with the content of the request, e.g., a confidence level that the request was a request to play "AC/DC" rather than, for example, "Hayseed Dixie," which are two very different bands with very similar sounding names. The confidence level may be determined based on user history, location, individually or in combination with any other information generally found in a user profile. In operation, determination of the confidence level may be performed by any one or more of CR 522, PBDs 532-538, NMDs 512-516, and/or computing devices 504-508, individually or in combination.

For example, in some embodiments, the media playback system receives a voice command from a registered user in the kitchen and determines a confidence level based on the voice command received. In operation, the media playback device may receive the voice command from any one or more of CR 522, NMDs 512-516, and/or PBDs 532-538. Next, the media playback system receives the same voice command from the registered user in another room in the user's house and determines a confidence level based on the voice command received. The media playback system may then determine a new confidence level based on the received commands from different devices in different rooms throughout the user's house, based at least in part on the room where the voice command was received. As a result, the media playback system may have a greater confidence level that the voice command was received from a registered user.

In another example, the media playback system may receive a voice command from a registered user and determine a confidence level based on user history. In particular, the media playback system may determine a higher confidence level if the voice command received includes an artist, playlist, genre, or any other information found in a user profile that is typically associated with the registered user. For example, if a registered user typically listens to songs by Michael Jackson, the media playback system may have a greater confidence level that the voice command to "Play Thriller" was received from a registered user. Likewise, if the registered user typically listens to songs by Michael Jackson or songs from the 1980's in general, the media playback system may have a greater confidence level that the voice command to "Play Thriller" is a command to play the song "Thriller" by the artist Michael Jackson rather than the song "Thriller" by the band Fall Out Boy. Many other examples, similar and different from the above, are possible.

In some embodiments, the media playback system may build a confidence level based on a registered user's pattern of voice commands found in a user's profile. For example, the media playback system may receive a voice command from a registered user to play a particular song by Britney Spears, and determine a confidence level based on the received voice command. Every time the media playback system receives the same voice command or similar voice command, such as a command to play another song by Britney Spears, the media playback system may build a higher confidence level and may have a greater confidence level that the voice command was received from that registered user.

Finally, method 700 advances to block 706, which includes in response to determining that the voice command was received from a registered user, configuring an instruction for the media playback system based on content from the voice command and information in a user profile for the registered user.

In some embodiments, the content from the voice command may include a command for one or more PBDs of the media playback system to play media content. In some embodiments, based on the command for one or more PBDs to play media content and information in a user profile for the registered user, the computing device 506 may configure an instruction or a set of instructions to cause the media playback system to obtain media or audio content from a preferred media source of a registered user.

In some embodiments, based on the command for the media playback system to play media content and information in a user profile for the registered user, the media playback system may configure an instruction or a set of instructions to cause the media playback system to play the media content via one or more PBDs of the media playback system.

In some embodiments, based on the command for the media playback system to play media content and information in a user profile for the registered user, the computing device 506 may include instructions to (i) configure the media playback system with one or more of the registered user's preferred playback settings and (ii) cause one or more PBDs of the media playback system to play the media content with the registered user's preferred playback settings. Preferred playback settings may be preferred playback settings stored in a registered user's user profile. Additionally or alternatively, preferred playback settings may be based on user history stored in a registered user's user profile. User history may include commonly used or previously used playback settings by the user to play media content.

In some embodiments, the content from the voice command may include a command for one or more PBDs of the media playback system to play media content but may not identify a particular listening zone or playback zone of the media playback system. Based on this content and information in a user profile for the registered user, such as user history, computing device 506 may configure an instruction or a set of instructions to cause the media playback system to play the media content via one or more media playback devices within the particular playback zone of the media playback system.

In some embodiments, the content from the voice command may include a command for the media playback system to modify a playback setting. Based on the command for the media playback system to modify a playback setting and information in a user profile for the registered user, computing device 506 may (i) configure an instruction or a set of instructions to cause the media playback system to modify the playback setting for one or more PBDs of the media playback system, and (ii) implement the configured instruction or set of instructions to modify the playback setting via the one or more PBDs.

Some embodiments include the media playback system determining whether the voice command was received from a child. In some embodiments, the computing device 506 may distinguish between an adult and a child based on information in a user profile if the child is one of the registered users of the media playback system. In some embodiments, the computing device 506 may distinguish between an adult and a child based on the tone or frequency of the user's voice.

In some embodiments, determining whether the voice command was received from a child may include determining a confidence level associated with a received voice command. As described above, a confidence level may be determined based on user history, location, individually or in combination with any other information generally found in a user profile.

For example, the media playback system may receive a voice command via a device (e.g., any of NMDs 512-516 or PBDs 532-538) in a particular room where a child is likely to be (e.g., child's bedroom, playroom, basement, etc). Because the command was received from a device located in a room where a child is likely to be, the media playback system may have a greater confidence level that the voice command was received from a child.

In another example, the media playback system may receive a voice command and determine a confidence level that the command was received from a child based on the content of the voice command. For example, if the media playback system receives a voice command to play a song from a cartoon show or movie, the media playback system may have a greater confidence level that the voice command was received from a child. Many other examples, similar and different from the above, are possible.

In response to determining that the voice command was received from a child, some embodiments may prevent one or more PBDs of the media playback system from playing given media that may be inappropriate for the child. Some embodiments may prevent the computing device 506 and/or one or more PBDs from modifying a playback setting based on the content of a child's voice command. For example, the computing device 506 may disregard a child's voice command to increase the volume of one or more PBDs.

Some embodiments include actions based on determining whether a voice command was received from a guest user instead of a registered user of the media playback system. In some embodiments, computing device 506 may have stored a previously created guest profile that may be associated with a particular guest. In some embodiments, computing device 506 may determine that a voice command was not received from a registered user, and may then ask the registered user if the voice command came from a guest.

In some embodiments, determining whether the voice command was received from a guest user may include the media playback system determining a confidence level associated with a voice command received. As described above, a confidence level may be determined based on user history, location, individually or in combination with any other information generally found in a user profile.

In response to determining that the voice command was received from a guest user, computing device 506 may (1) assign a restriction setting for the guest user, (2) configure an instruction for one or more PBDs based on content from the voice command and the assigned restriction setting for the guest user, and (3) send the instruction to one or more PBDs for execution. In some embodiments, assigning a restriction setting for a guest user may include computing device 506 matching the voice command to a particular guest profile stored on the computing device 506. The guest profile may include restriction settings, and information regarding the voice of the particular guest user, such as frequency or tone of the guest's voice, among other information previously described. A restriction setting may be any setting that limits the control of the media playback system.

Some embodiments include the media playback system applying an order of preference to resolve conflicting voice commands received from different users. Conflicting voice commands may be, for example, a voice command received from a user to play a song and a subsequent voice command received from another user to stop playing the song. Other examples are possible, such as a voice command received from a user to increase the volume of one or more playback devices (e.g., PBDs 532, 534, 536, and 538) and a subsequent voice command received from another user to decrease the volume. In particular, the media playback system may receive a voice command from a registered user or host to play a song in a playback zone. Subsequently, the media playback system may receive a conflicting voice command from a nonregistered user or guest to stop playing the song in the playback zone. To resolve this conflict, the media playback system may apply an order of preference in which voice commands received from a registered user have a higher priority than voice commands from a nonregistered user or guest.

In some embodiments, the media playback system may assign an order of preference in which voice commands received from registered guests have a higher priority than voice commands received from nonregistered guests. In some embodiments, voice commands received from one registered guest may have a higher priority than another registered guest. Additionally or alternatively, voice commands received from an adult may have a higher priority than a child.

In still further embodiments, controller-issued commands received by the media playback system (e.g., commands received from CR 522 or other computing devices configured to control the media playback system, or perhaps commands received from computing device 506) may have a lower priority than a registered user, but may have a higher priority than a nonregistered user or guest. In some embodiments, some registered guest may have a higher priority than controller-issued commands. Other examples of determining and assigning an order of preference are possible.

After configuring an instruction or set of instructions for the media playback system, some embodiments may send the instruction or set of instructions to one or more PBDs of the media playback system to execute the instructions. In some embodiments, the computing device 506 may send the instruction or set of instructions to the networked microphone system.

Figure 8:
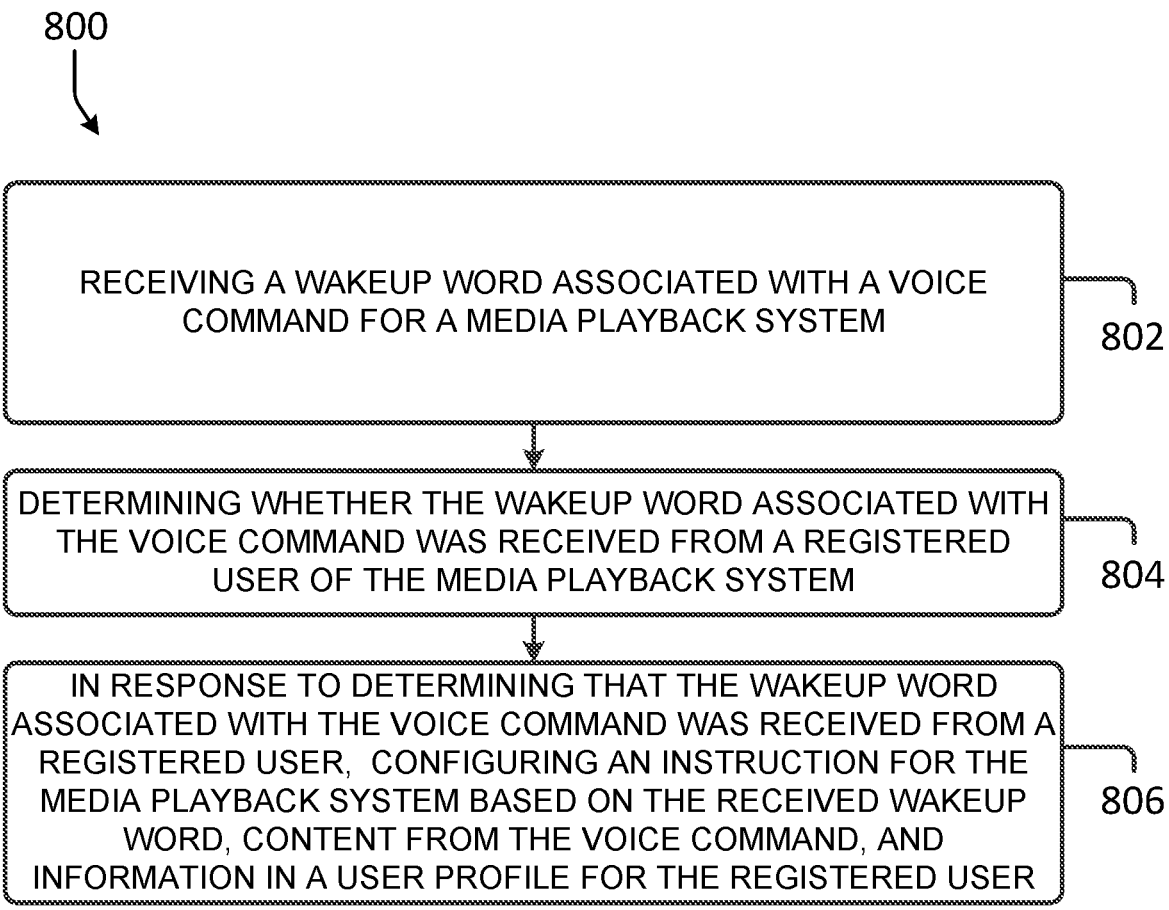
FIG. 8 shows another example method according to some embodiments.

Method 800 shown in FIG. 8 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, and/or the configuration shown in FIG. 5. Method 800 may include one or more operations, functions, or actions as illustrated by one or more of blocks 802-806. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

Method 800 begins at block 802, which includes receiving a wakeup word or wakeup phrase associated with a voice command for a media playback system. A wakeup word or phrase, as described above, may be a specific word or phrase (e.g., "Hey, Sonos") stored in a user profile. In some embodiments, the media playback system, may receive a universal wakeup word or phrase (e.g., "Hey Sonos") associated with a voice command of a registered user. Additionally or alternatively, the media playback system may receive a universal wakeup word or phrase associated with a voice command of a registered guest user. In some embodiments, the media playback system may be configured for different registered users to have different wake up words or phrases.

In some embodiments, a registered user may have a different, user-specific wakeup word or phrase for different voice commands. For example, the media playback system may receive a wakeup word or phrase to add songs to a play queue (e.g., "Hey Sonos, let's queue up songs" "Yo, Sonos, queue songs," "Alpha song queue," etc), and may receive a different user-specific wake up word or phrase to authorize guests in a house to control the media playback device (e.g., "Hey Sonos, open access," "It's party time," etc).

Next, method 800 advances to block 804, which includes determining whether the wakeup word associated with the voice command was received from a registered user of the media playback system. In some embodiments, determining whether the wakeup word associated with a voice command was received from a registered user may be similar to determining whether a voice command was received from a registered user described in block 704 for method 700.

Finally, method 800 advances to block 806, which includes in response to determining that the wakeup word associated with the voice command was received from a registered user, configuring an instruction for the media playback system based on the received wakeup word, content from the voice command, and information in a user profile for the registered user.

In some embodiments, the instruction for the media playback system may include an instruction to open a time period or window for the media playback system to receive additional voice commands associated with the received wakeup word from the registered user, a guest, and/or a nonregistered user. For example, in response to determining that the wakeup word to add songs to a play queue was received from a registered user, the media playback system may open a time period (e.g., five minutes) for the registered user to send additional voice commands to add specific songs to the play queue (e.g., "Add Thriller by Michael Jackson").

In another example, in response to determining that the wakeup word to authorize all guests to control the media playback system was received from a registered user, the media playback system may open a time period (e.g., one hour) to allow all guests in a house to send voice commands to add songs to a play queue, play songs, or change the volume, among other functions for a user-defined or default time period or window.

Next, method 800 advances to block 806, which includes in response to determining that the wakeup word was received from a registered user, determining whether the wakeup word is associated with a restriction setting based on the received wakeup word or phrase, content from the voice command, and information in a user profile for the registered user.

In some embodiments, the media playback system may configure an instruction based on restriction settings in a user profile for the registered user or registered guest user. A wakeup word received from a registered user may be associated with restriction settings for certain guests. For example, a registered user or host may send a voice command (e.g., "Hey Sonos, restrict control for my living room to authorized guests") that authorizes registered guests to send additional voice commands for a time period or window to control one or more PBDs 532, 534, 536, and 538 and/or computing device 506 in a playback zone, while preventing nonregistered guests from sending additional voice commands. In yet another example, the wake up word received may be associated with restriction settings for a child. Many other examples, similar and different from the above, are possible, including but not limited to the examples described elsewhere herein.

In some embodiments, a wakeup word received from a registered user may be associated with restriction settings that allow certain guests to have restricted control of the media playback system for a time period or window. U.S. Patent Pub. No. 2013/0346859 entitled, "Systems, Methods, Apparatus, and Articles of Manufacture to Provide a Crowd-Sourced Playlist with Guest Access," which is hereby incorporated by reference, provides in more detail some examples for restricted control of the media playback system.

In some embodiments, in response to determining that a wakeup word or wakeup phrase was received from a guest user, the media playback system may (i) determine whether there is a restriction setting associated with the guest user, (ii) configure an instruction for one or more PBDs based on the wakeup word or phrase and the assigned restriction setting for the guest user, and (iii) send the instruction to one or more PBDs for execution (e.g., to open a time period or window to receive additional voice commands associated with the wake up word command).

In some embodiments, the media playback device, via the one or more PBDs 532, 534, 536, and 538 and/or computing device 506, may refrain from taking actions based on receiving a wakeup word or phrase from a registered guest user if, for example, the media playback system has already received a voice command with a wakeup word or phrase from a registered user or host, and the time period or window to receive additional commands has not expired.

After configuring an instruction or set of instructions for the media playback system, some embodiments may include sending commands or set of commands to one or more PBDs of the media playback system to execute the instructions. In some embodiments, the computing device 506 may send the commands or set of commands to one or more PBDs of the media playback system.

In some embodiments, after configuring an instruction or set of instructions for the media playback system to execute, a registered user or host may close or key off the time period or window for receiving additional voice commands associated with the instruction. For example, if a registered user or host sends a voice command with a wake up word or phrase that opens a time period or window to receive additional voice commands for an hour, the registered user or host may send another voice command (e.g., "Hey Sonos, queue songs complete") to key off the one hour time period or window before the one hour time period expires. Many other examples, similar and different from the above, are possible.

In some embodiments, the media playback system may take actions based on receiving a wakeup word or wakeup phrase from a registered guest user and subsequently close or key off the time period or window for receiving additional voice commands if the media playback device subsequently receives a voice command from a registered user or host. In some embodiments, the registered guest may close or key off the time period or window before it expires. In other embodiments, an adult may close or key off the time period or window before it expires if the registered guest is a child. Many other examples, similar and different from the above, are possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. Tangible, non-transitory computer-readable media having instructions encoded thereon, wherein the instructions, when executed by one or more processors, cause a computing device to perform a method comprising:
    storing in association with a first profile for a media playback system, (i) a first wakeup word and (ii) a first music service account;
    storing in association with a second profile for the media playback system, (i) a second wakeup word and (ii) a second music service account;
    receiving, via a network microphone device of the media playback system, a first voice input comprising (i) the first wakeup word and (ii) a first voice command, wherein the first wakeup word triggers a time period for the media playback system to receive additional voice commands;
    after receiving the first voice input, identifying the first profile based on the first wakeup word, configuring a first instruction based on (i) the first voice command and (ii) the first music service account, and transmitting the configured first instruction to a remote computing device associated with the first music service account;
    after the time period has expired, receiving, via the network microphone device, a second voice input comprising (i) the second wakeup word and (ii) a second voice command;
    after receiving the second voice input, (i) identifying the second profile based on the second wakeup word and (ii) determining whether the second profile has a permission granted by the media playback system;
    in response to determining that the permission is granted, configuring a second instruction based on (i) the second voice command and (ii) the second music service account; and
    transmitting the configured second instruction to a remote computing device associated with the second music service account.

2. The tangible, non-transitory computer-readable media of claim 1, wherein the first voice command is a command to control the media playback system.

3. The tangible, non-transitory computer-readable media of claim 2, wherein the command to control the media playback system is a command to play media content.

4. The tangible, non-transitory computer-readable media of claim 1, wherein configuring the first instruction comprises configuring the first instruction to cause the media playback system to obtain media content from the remote computing device associated with the first music service account.

5. The tangible, non-transitory computer-readable media of claim 1, wherein the first profile is further associated with a particular playback zone of the media playback system, wherein the first voice command is a command for the media playback system to play media content, wherein the first voice command does not identify a playback zone, and wherein configuring the first instruction comprises configuring the first instruction to cause the media playback system to play the media content in the particular playback zone of the media playback system.

6. The tangible, non-transitory computer-readable media of claim 1, wherein the first profile is further associated with one or more playback settings, wherein the first voice command is a command for the media playback system to play media content, and wherein configuring the first instruction comprises configuring the first instruction to cause the media playback system to play the media content according to the one or more playback settings associated with the first profile.

7. The tangible, non-transitory computer-readable media of claim 6, wherein the one or more playback settings associated with the first profile comprise one or more of (i) a preferred playback volume and (ii) a preferred audio equalization setting.

8. A computing device comprising:
    one or more processors; and
    tangible, non-transitory computer-readable media having instructions encoded thereon, wherein the instructions, when executed by the one or more processors, cause the computing device to perform a method comprising:
    storing in association with a first profile for a media playback system, (i) a first wakeup word and (ii) a first music service account;
    storing in association with a second profile for the media playback system, (i) a second wakeup word and (ii) a second music service account;
    receiving, via a network microphone device of the media playback system, a first voice input comprising (i) the first wakeup word and (ii) a first voice command, wherein the first wakeup word triggers a time period for the media playback system to receive additional voice commands;
    after receiving the first voice input, identifying the first profile based on the first wakeup word, configuring a first instruction based on (i) the first voice command and (ii) the first music service account, and transmitting the configured first instruction to a remote computing device associated with the first music service account;
    after the time period has expired, receiving, via the network microphone device, a second voice input comprising (i) the second wakeup word and (ii) a second voice command;
    after receiving the second voice input, (i) identifying the second profile based on the second wakeup word and (ii) determining whether the second profile has a permission granted by the media playback system;

in response to determining that the permission is granted, configuring a second instruction based on (i) the second voice command and (ii) the second music service account; and transmitting the configured second instruction to a remote computing device associated with the second music service account.

9. The computing device of claim 8, wherein the first voice command is a command to control the media playback system.

10. The computing device of claim 9, wherein the command to control the media playback system is a command to play media content.

11. The computing device of claim 8, wherein configuring the first instruction comprises configuring the first instruction to cause the media playback system to obtain media content from the remote computing device associated with the first music service account.

12. The computing device of claim 8, wherein the first profile is further associated with a particular playback zone of the media playback system, wherein the first voice command is a command for the media playback system to play media content, wherein the first voice command does not identify a playback zone, and wherein configuring the first instruction comprises configuring the first instruction to cause the media playback system to play the media content in the particular playback zone of the media playback system.

13. The computing device of claim 8, wherein the first profile is further associated with one or more playback settings, wherein the first voice command is a command for the media playback system to play media content, and wherein configuring the first instruction comprises configuring the first instruction to cause the media playback system to play the media content according to the one or more playback settings associated with the first profile.

14. The computing device of claim 13, wherein the one or more playback settings associated with the first profile comprise one or more of (i) a preferred playback volume and (ii) a preferred audio equalization setting.

15. A method comprising:

a computing device storing in association with a first profile for a media playback system, (i) a first wakeup word and (ii) a first music service account;

the computing device storing in association with a second profile for the media playback system, (i) a second wakeup word and (ii) a second music service account;

receiving, via a network microphone device of the media playback system, a first voice input comprising (i) the first wakeup word and (ii) a first voice command, wherein the first wakeup word triggers a time period for the media playback system to receive additional voice commands;

after receiving the first voice input, the computing device identifying the first profile based on the first wakeup word, configuring a first instruction based on (i) the first voice command and (ii) the first music service account, and transmitting the configured first instruction to a remote computing device associated with the first music service account;

after the time period has expired, receiving, via the network microphone device, a second voice input comprising (i) the second wakeup word and (ii) a second voice command;

after receiving the second voice input, (i) the computing device identifying the second profile based on the second wakeup word and (ii) determining whether the second profile has a permission granted by the media playback system;

in response to determining that the permission is granted, the computing device configuring a second instruction based on (i) the second voice command and (ii) the second music service account; and the computing device transmitting the configured second instruction to at least one remote computing device associated with the second music service account.

16. The method of claim 15, wherein the first voice command is a command to control the media playback system.

17. The method of claim 16, wherein the command to control the media playback system is a command to play media content.

18. The method of claim 15, wherein configuring the first instruction comprises the computing device configuring the first instruction to cause the media playback system to obtain media content from the at least one remote computing device associated with the first music service account.

19. The method of claim 15, wherein the first profile is further associated with a particular playback zone of the media playback system, wherein the first voice command is a command for the media playback system to play media content, wherein the first voice command does not identify a playback zone, and wherein configuring the first instruction comprises the computing device configuring the first instruction to cause the media playback system to play the media content in the particular playback zone of the media playback system.

20. The method of claim 15, wherein the computing device comprises the network microphone device.

* * * * *